US010168733B2

(12) United States Patent
Lee et al.

(10) Patent No.: US 10,168,733 B2
(45) Date of Patent: Jan. 1, 2019

(54) FOLDABLE BODY AND FOLDABLE DISPLAY APPARATUS

(71) Applicant: Industrial Technology Research Institute, Hsinchu (TW)

(72) Inventors: Chien-Ju Lee, Taoyuan (TW); Yung-Hui Yeh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 25 days.

(21) Appl. No.: 15/099,611

(22) Filed: Apr. 15, 2016

(65) Prior Publication Data

US 2017/0118853 A1  Apr. 27, 2017

Related U.S. Application Data

(60) Provisional application No. 62/245,291, filed on Oct. 23, 2015.

(30) Foreign Application Priority Data

Dec. 31, 2015 (TW) .............................. 104144575 A

(51) Int. Cl.
*G06F 1/16* (2006.01)
*G09F 9/30* (2006.01)
*H04M 1/02* (2006.01)

(52) U.S. Cl.
CPC .......... *G06F 1/1616* (2013.01); *G06F 1/1652* (2013.01); *G09F 9/301* (2013.01); *H04M 1/0268* (2013.01)

(58) Field of Classification Search
CPC ...... G06F 1/1616; G06F 1/1652; G09F 9/301; H04M 1/0268; H05K 5/0217
See application file for complete search history.

(56) References Cited

U.S. PATENT DOCUMENTS 2,867,839 A * 1/1959 Squire ...................... E05D 3/18
16/358
5,169,221 A * 12/1992 Wheeler .................. H05K 7/16
16/358

(Continued)

FOREIGN PATENT DOCUMENTS

CN    101325848    12/2008
CN    202816269    3/2013

(Continued)

*Primary Examiner* — Nathan Milakovich
(74) *Attorney, Agent, or Firm* — JCIPRNET

(57) ABSTRACT

A foldable body is adapted to be connected between two neighboring ones of a plurality of supporting units, such that the two neighboring supporting units are moved relative to each other to flatten or bend a flexible display panel mounted on a supporting surface of each of the supporting units. The foldable body includes a main track and a main shaft. The main track is fixedly connected to one of the two neighboring supporting units. The main shaft is fixedly connected to the other of the two neighboring supporting units and is coupled to the main track to be translated and rotated in the main track. The two neighboring supporting units are connected by the foldable body, such that the supporting units are moved, such as being translated, rotated, or both, relative to each other, to bend at least a portion of the flexible display panel.

11 Claims, 34 Drawing Sheets

(56) References Cited

U.S. PATENT DOCUMENTS

| | | | |
|---|---|---|---|
| 6,831,229 B1 * | 12/2004 | Maatta | G06F 1/1616 174/50 |
| 8,727,601 B2 * | 5/2014 | Wang | G09F 9/301 361/679.01 |
| 8,736,162 B2 | 5/2014 | Jin et al. | |
| 9,119,317 B2 | 8/2015 | Primavera | |
| 9,173,288 B1 * | 10/2015 | Kim | G06F 1/1633 |
| 9,179,559 B1 * | 11/2015 | Kim | G06F 1/1616 |
| 9,189,032 B2 * | 11/2015 | Jheng | G06F 1/1681 |
| 9,512,655 B2 * | 12/2016 | Kuo | E05D 1/04 |
| 9,603,271 B2 * | 3/2017 | Lee | H05K 5/0017 |
| 9,801,290 B2 * | 10/2017 | Ahn | H05K 5/0017 |
| 2012/0044620 A1 * | 2/2012 | Song | G06F 1/1616 361/679.01 |
| 2012/0151758 A1 | 6/2012 | Primavera | |
| 2013/0021762 A1 | 1/2013 | van Dijk et al. | |
| 2014/0247405 A1 | 9/2014 | Jin et al. | |
| 2015/0062467 A1 | 3/2015 | Kang | |
| 2015/0233162 A1 | 8/2015 | Lee et al. | |
| 2015/0261259 A1 * | 9/2015 | Endo | G06F 1/1652 361/679.06 |
| 2017/0360170 A1 * | 12/2017 | Lin | A45C 11/00 |

FOREIGN PATENT DOCUMENTS

| | | |
|---|---|---|
| CN | 103228114 | 7/2013 |
| CN | 103294113 | 9/2013 |
| CN | 203912398 | 10/2014 |
| CN | 203982278 | 12/2014 |
| CN | 104282224 | 1/2015 |
| CN | 104571292 | 4/2015 |
| EP | 2728434 | 5/2014 |
| JP | 4267687 | 5/2009 |
| KR | 20040000847 | 1/2004 |
| KR | 20060028947 | 4/2006 |
| KR | 101144136 | 5/2012 |
| KR | 20150099677 | 9/2015 |
| TW | 200850104 | 12/2008 |
| TW | M395341 | 12/2010 |
| TW | 201128594 | 8/2011 |
| TW | 201205155 | 2/2012 |
| TW | 201311066 | 3/2013 |
| TW | 201535711 | 9/2015 |

* cited by examiner

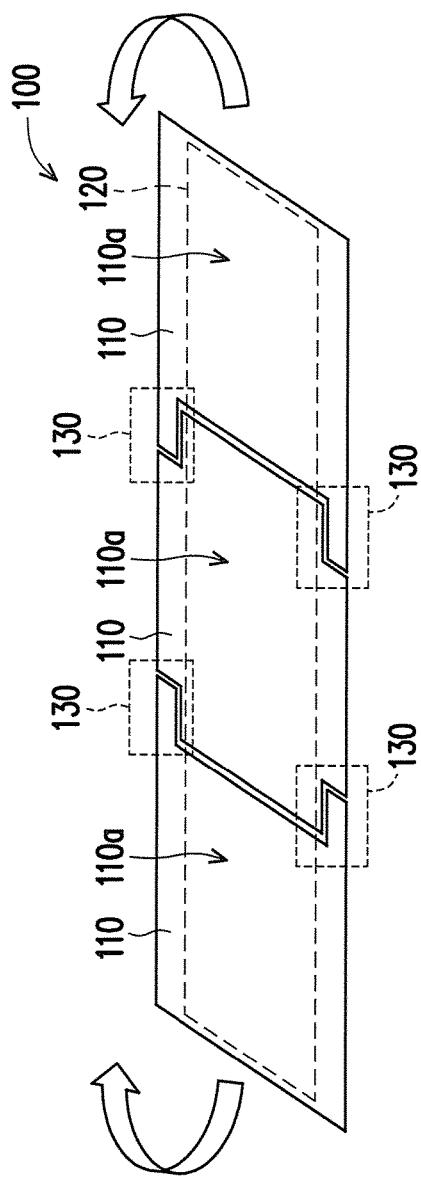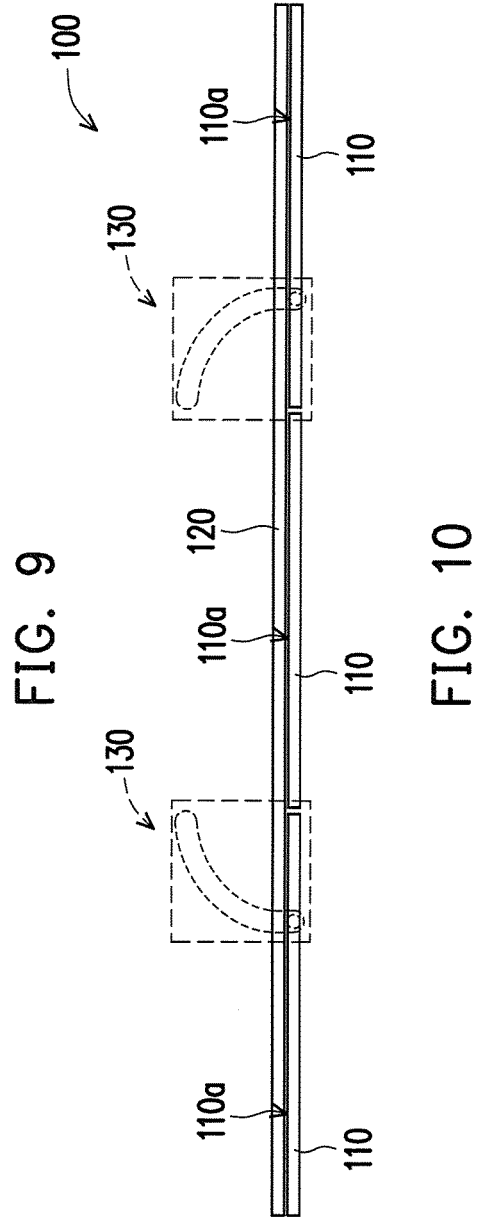
FIG. 9
FIG. 10

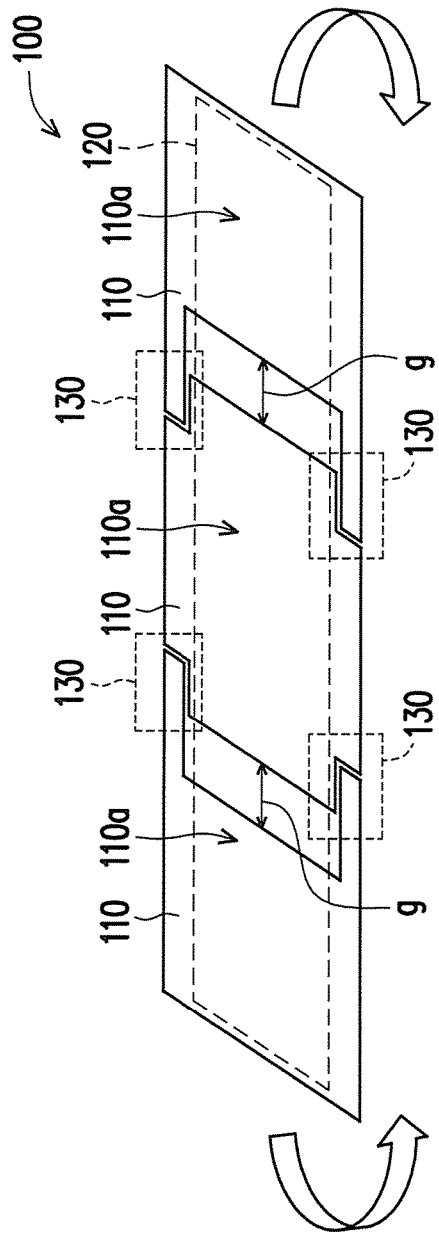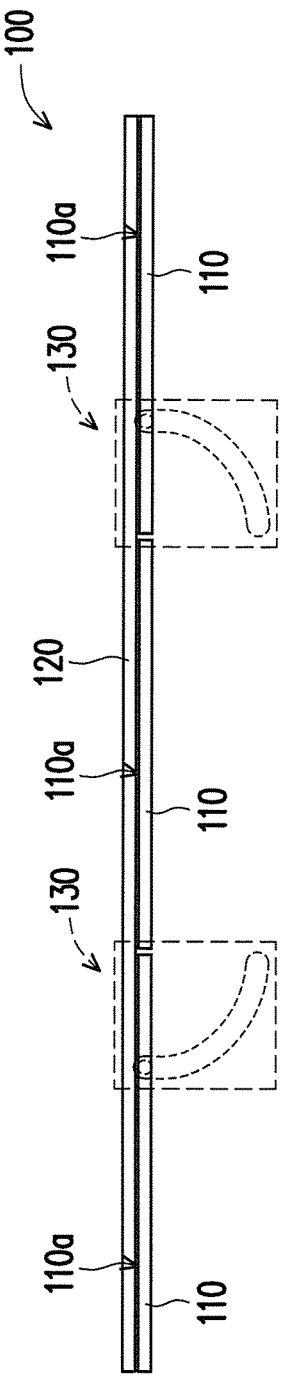
FIG. 11
FIG. 12

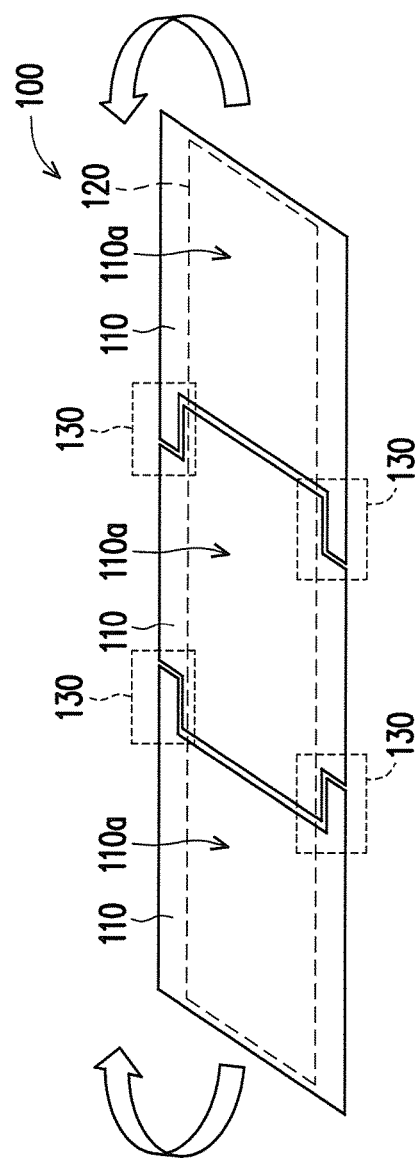
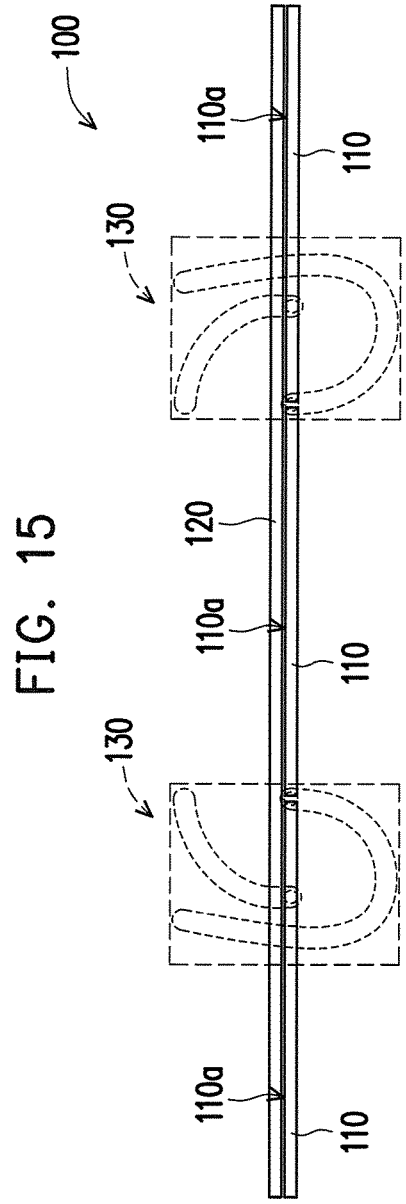

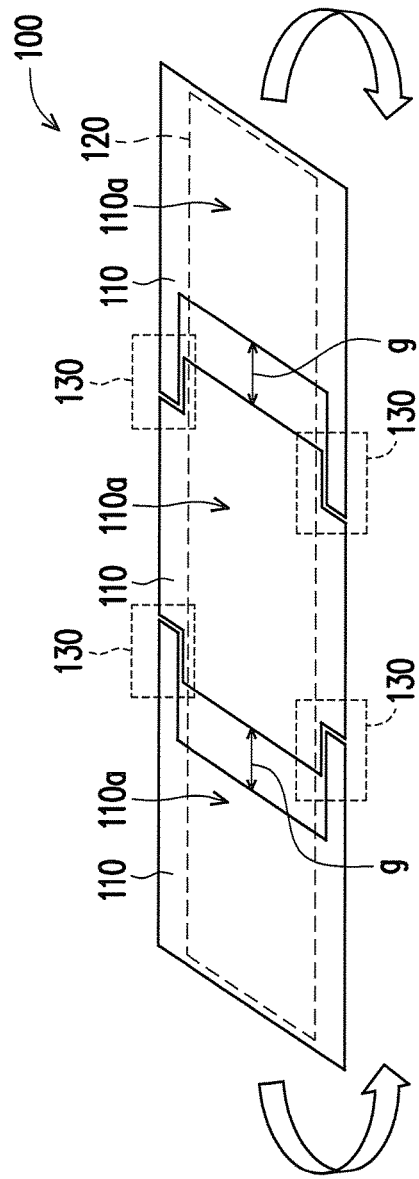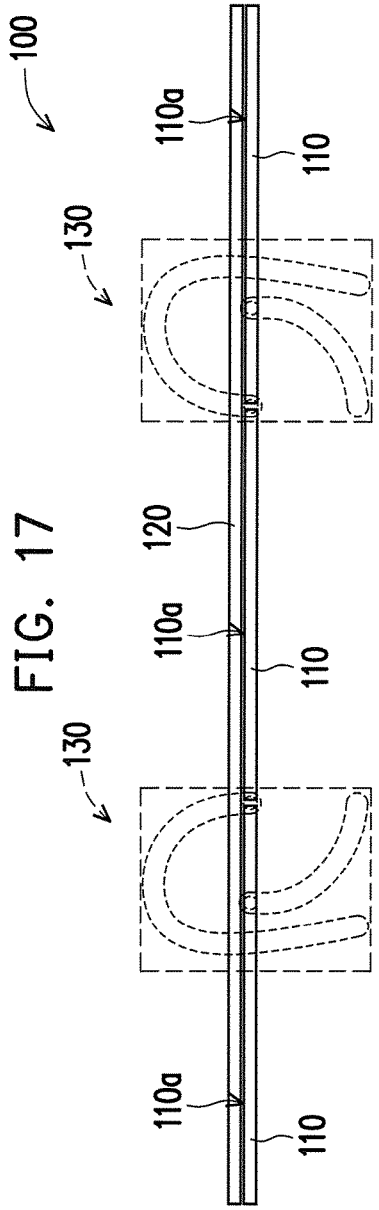

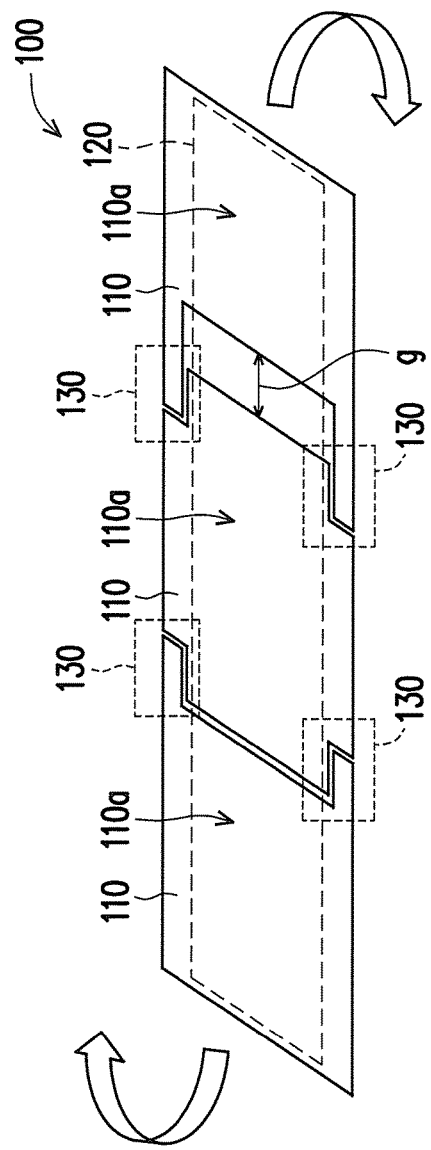
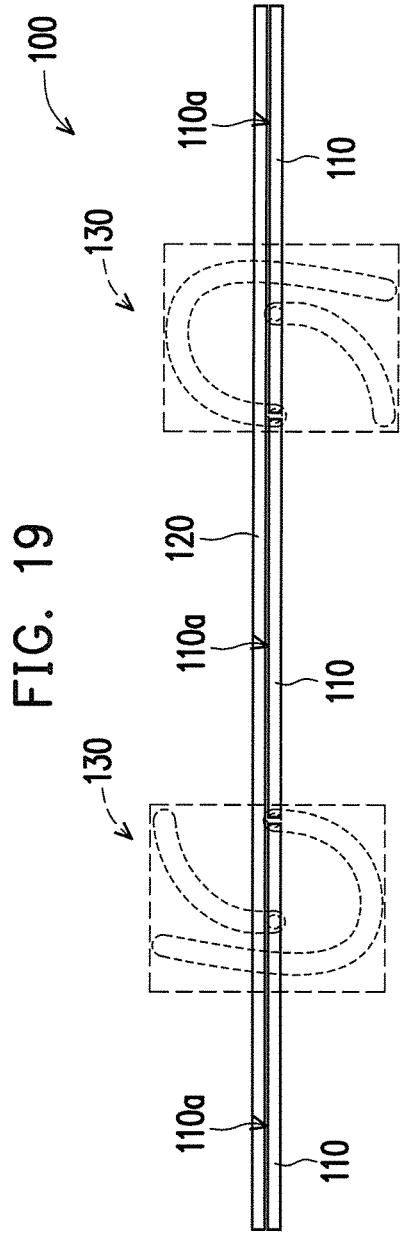
FIG. 19
FIG. 20

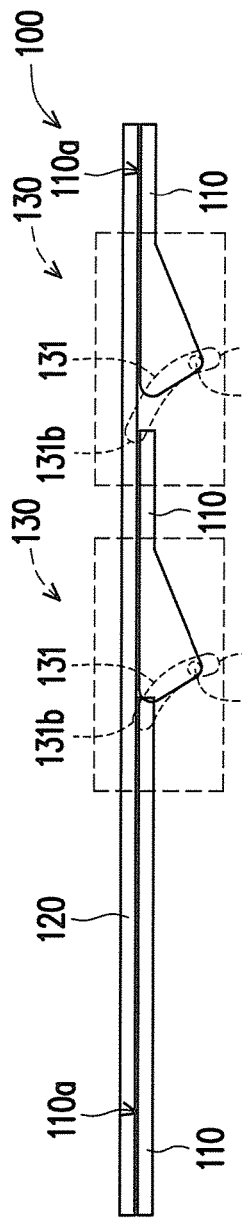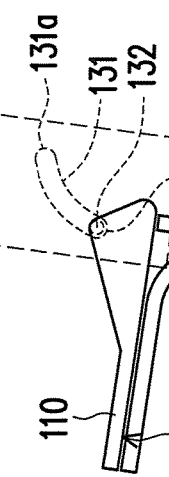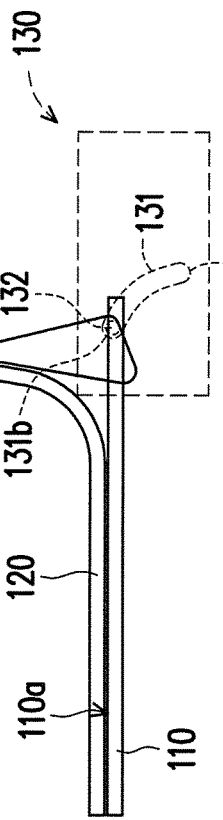
FIG. 22A
FIG. 22B

FOLDABLE BODY AND FOLDABLE DISPLAY APPARATUS

CROSS-REFERENCE TO RELATED APPLICATION

This application claims the priority benefits of U.S. provisional application Ser. No. 62/245,291, filed on Oct. 23, 2015 and Taiwan application serial no. 104144575, filed on Dec. 31, 2015. The entirety of each of the above-mentioned patent applications is hereby incorporated by reference herein and made a part of this specification.

TECHNICAL FIELD

The disclosure relates to a display apparatus, and in particular, a foldable body and a foldable display apparatus using the foldable body.

BACKGROUND

Since a flexible display panel is characterized as thin, light, and bendable, applications of the flexible display panel have become more and more diversified. Through folding or rolling, space occupied by the flexible display panel can be reduced. In terms of the manner of folding, the tension applied onto the flexible display panel has to be controlled, the flexible display panel itself cannot be squeezed so as not to cause permanent creases, and the entire surface of the flexible display panel needs to be supported when in use.

SUMMARY

The disclosure provides a foldable body adapted to be used in a foldable display apparatus.

The disclosure provides a foldable display apparatus adapted to provide a large display area but occupy little storage space.

A foldable body of the disclosure is adapted to be connected between two neighboring ones of a plurality of supporting units, such that the two neighboring supporting units are moved relative to each other to flatten or bend a flexible display panel mounted on a supporting surface of each of the supporting units. The foldable body includes a main track and a main shaft. The main track is fixedly connected to one of the two neighboring supporting units. The main shaft is fixedly connected to the other of the two neighboring supporting units and is coupled to the main track to be translated and rotated in the main track.

A foldable display apparatus of the disclosure includes a plurality of supporting units, a flexible display panel, and at least a pair of foldable bodies. Each supporting unit includes a supporting surface. The flexible display panel is mounted on the supporting surfaces. The pair of foldable bodies are connected between two neighboring ones of the supporting units, such that the two neighboring supporting units are moved relative to each other. Each of the foldable bodies includes a main track and a main shaft. The main track is fixedly connected to one of the two neighboring supporting units. The main shaft is fixedly connected to the other of the two neighboring supporting units and is coupled to the main track to be translated and rotated in the main track.

A foldable display apparatus of the disclosure includes a plurality of supporting units, a flexible display panel, and at least a pair of foldable bodies. Each supporting unit includes a supporting surface. The flexible display panel is mounted on the supporting surfaces. The pair of foldable bodies are connected between two neighboring ones of the supporting units, such that the two neighboring supporting units are moved relative to each other. Each of the foldable bodies includes an axial portion, a bearing, and a stopper portion. The axial portion is fixedly connected to one of the two neighboring supporting units. The bearing is fixedly connected to the other of the two neighboring supporting units and works with the axial portion, such that the axial portion and the bearing are rotated relative to each other. The stopper portion is fixedly connected to one or the other of the two neighboring supporting units. When the stopper portion relatively stops the two neighboring supporting units, the supporting surfaces are configured to be spaced part by an interval.

In light of the above, in the disclosure, the two neighboring supporting units are connected by the foldable bodies, such that the supporting units are moved, such as being translated, rotated, or both, relative to each other, to bend at least a portion of the flexible display panel. Moreover, through operations of bending inward or bending outward, the flexible display panel is concealed or at least a portion of the flexible display panel is exposed.

BRIEF DESCRIPTION OF THE DRAWINGS

FIG. 9 is a schematic view of a foldable display apparatus of another embodiment of the disclosure.

FIG. 10 illustrates the foldable display apparatus of FIG. 9 in a flattened state.

FIG. 11 is a schematic view of a foldable display apparatus of another embodiment of the disclosure.

FIG. 12 illustrates the foldable display apparatus of FIG. 11 in a flattened state.

FIG. 15 is a schematic view of a foldable display apparatus of another embodiment of the disclosure.

FIG. 16 illustrates the foldable display apparatus of FIG. 15 in a flattened state.

FIG. 17 is a schematic view of a foldable display apparatus of another embodiment of the disclosure.

FIG. 18 illustrates the foldable display apparatus of FIG. 17 in a flattened state.

FIG. 19 is a schematic view of a foldable display apparatus of another embodiment of the disclosure.

FIG. 20 illustrates the foldable display apparatus of FIG. 19 in a flattened state.

FIGS. 22A to 22B illustrate a transitional process of a foldable display apparatus of another embodiment of the disclosure.

DESCRIPTION OF THE EMBODIMENTS

Figure 1:
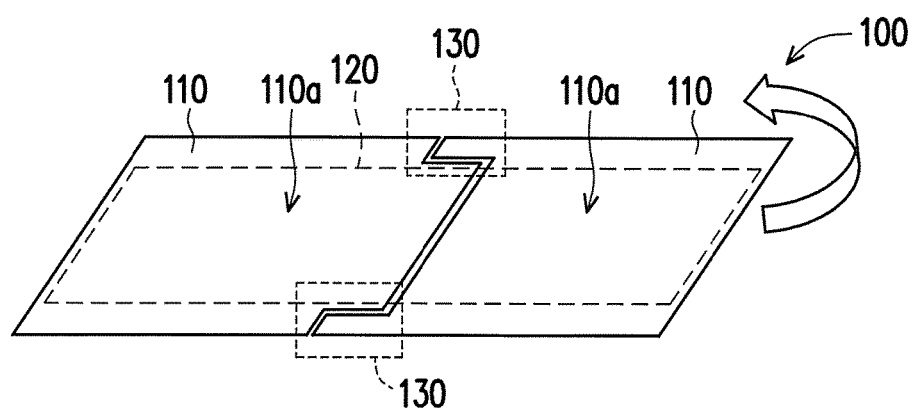
FIG. 1 is a schematic view of a foldable display apparatus of one embodiment of the disclosure.
Figure 2A:
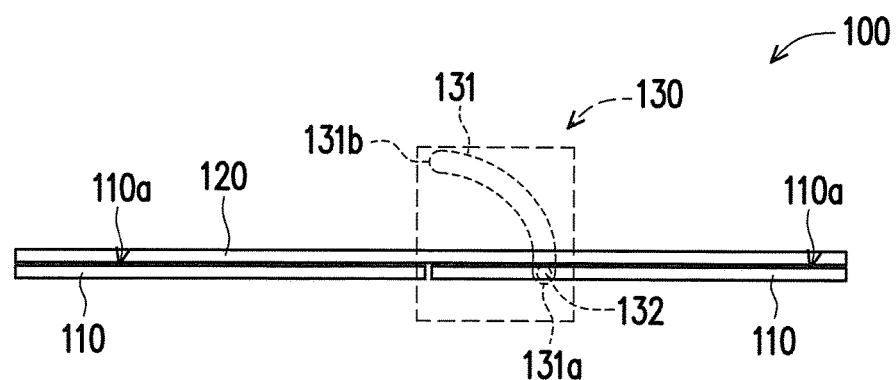
FIGS. 2A to 2D illustrate a transitional process of the foldable display apparatus of FIG. 1.

Referring to FIG. 1 and FIG. 2A, in the present embodiment, a foldable display apparatus 100 includes two supporting units 110, a flexible display panel 120, and a pair of foldable bodies 130. Each of the supporting units 110 includes a supporting surface 110a. The flexible display panel 120 is mounted on the supporting surfaces 110a. The pair of foldable bodies 130 connect the two supporting units 110 such that the two supporting units 110 are moved relative to each other to flatten or bend the flexible display panel 120.

In the present embodiment, each of the foldable bodies 130 includes a main track 131 and a main shaft 132. The main track 131 is fixedly connected to one of the two neighboring supporting units 110 (e.g., the supporting unit 110 on the left side) and includes a first main position point 131a and a second main position point 131b. The main shaft 132 is fixedly connected to the other of the two neighboring supporting units 110 (e.g., the supporting unit 110 on the right side) and is coupled to the main track 131 to be translated and rotated in the main track 131.

As FIG. 2A illustrates, when the main shaft 132 is moved along the main track 131 to the first main position point 131a in the main track 131, the supporting surfaces 110a are configured to be parallel to each other. Therefore, the flexible display panel 120 can be supported by the supporting surfaces 110a when in use.

Figure 2B:
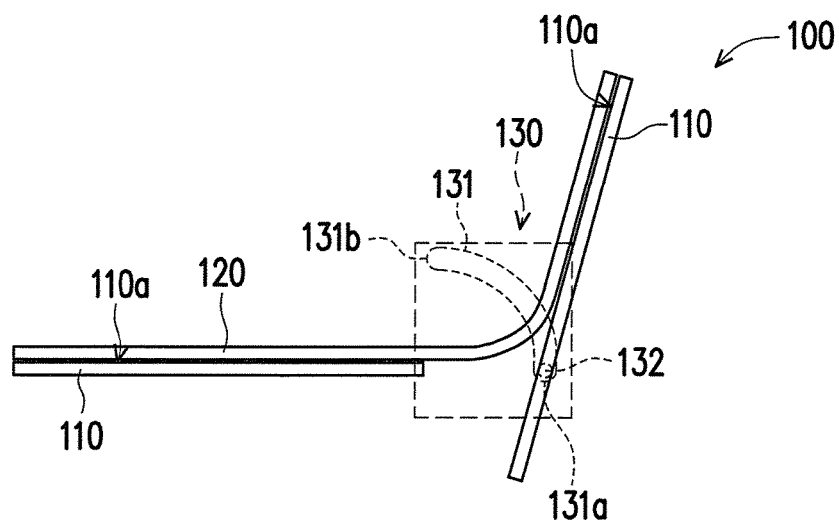

As FIGS. 2A to 2B illustrate, when the main shaft 132 is at the first main position point 131a in the main track 131, rotation of the main shaft 132 relative to the main track 131 causes the supporting unit 110 on the right side to be rotated relative to the supporting unit 110 on the left side. As FIG. 2B illustrates, when the flexible display panel 120 is bent inward (upward), part of the supporting unit 110 on the right side moves downward. In the present embodiment, the supporting units 110 are designed to be protruding on the left and withdrawn on the right, wherein the main shaft 132 is configured to be on an extension portion of the supporting unit 110 on the right (withdrawn) side. Therefore, in a bending process, the extension portion of the supporting unit 110 moves downward. Thereby, the tension of the flexible display panel 120 can be cancelled.

Figure 2C:
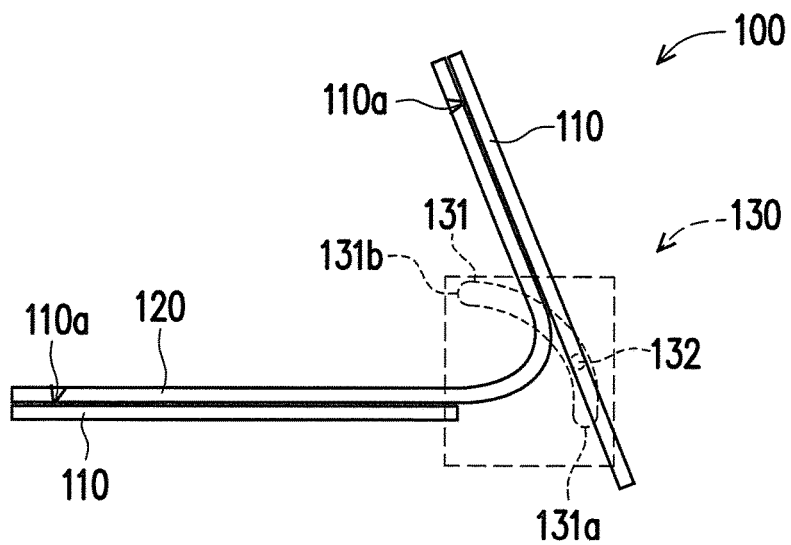
Figure 2D:
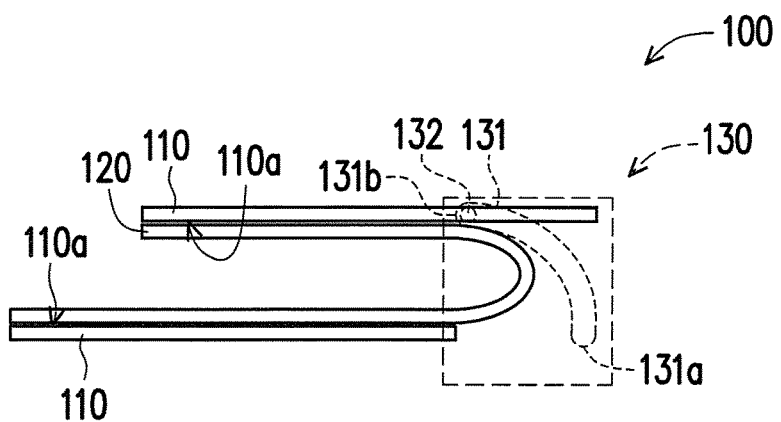

As FIGS. 2B to 2D illustrate, when the main shaft 132 is moved along the main track 131 to the second main position point 131b in the main track 131, the supporting surfaces 110a are configured to be spaced apart by an interval such that the supporting surfaces 110a face each other. As FIG. 2D illustrates, the interval between the two supporting surfaces 110a is determined or controlled by a radius of curvature of the main track 131. A mechanism designer may adjust the radius of curvature of the main track 131 according to the flexibility of the flexible display panel 120 or the situation of use. Therefore, the flexible display panel 120 can retain its radius of curvature in a folded state, such that the flexible display panel 120 in a folded region is not squeezed. Thereby, a portion of the flexible display panel 120 can be bent to the extent of not being distorted.

In the embodiment illustrated in FIG. 1 and FIGS. 2A to 2D, an operation of bending inward via one single track and one single shaft has been disclosed. In the embodiment illustrated in FIG. 3A and FIGS. 4A to 4D, an operation of bending inward via double tracks and double shafts will be disclosed.

Figure 3A:
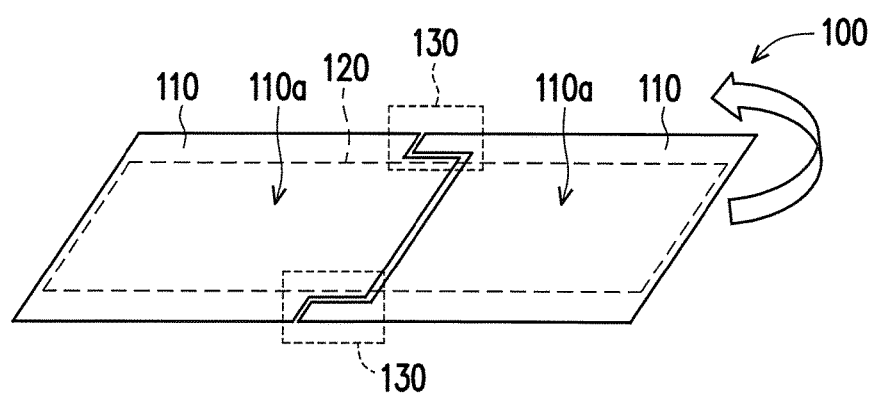
FIG. 3A is a schematic view of a foldable display apparatus of another embodiment of the disclosure.
Figure 4A:
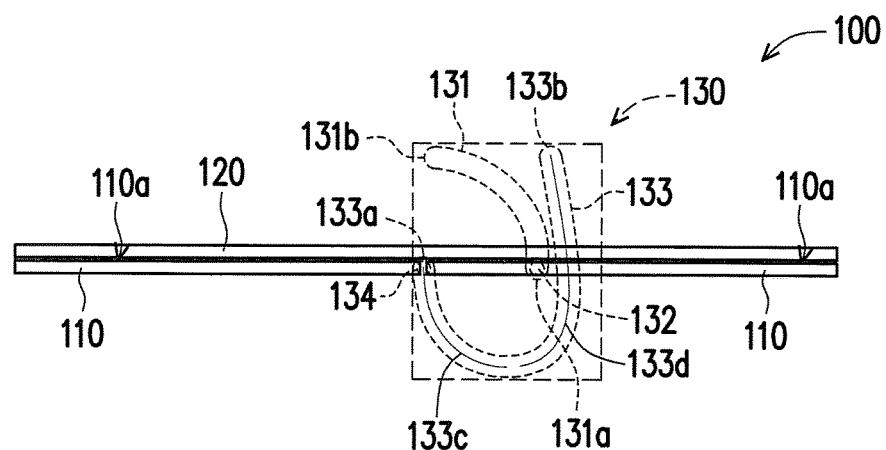
FIGS. 4A to 4D illustrate a transitional process of the foldable display apparatus of FIG. 3A.

Referring to FIGS. 3A and 4A, compared with the embodiment of FIGS. 1 and 2A, in the present embodiment, each of the foldable bodies 130 of the foldable display apparatus 100 further includes an auxiliary track 133 and an auxiliary shaft 134. The auxiliary track 133 is fixedly connected to one of the two neighboring supporting units 110 (e.g., the supporting unit 110 on the left side) and includes a first auxiliary position point 133a and a second auxiliary position point 133b. The auxiliary shaft 134 is fixedly connected to the other of the two neighboring supporting units 110 (e.g., the supporting unit 110 on the right side) and is coupled to the auxiliary track 133 to be translated and rotated in the auxiliary track 133. Through the configuration of the auxiliary track 133 and the auxiliary shaft 134, the flexible display panel 120 can be steadier in processes of flattening and folding.

Figure 3B:
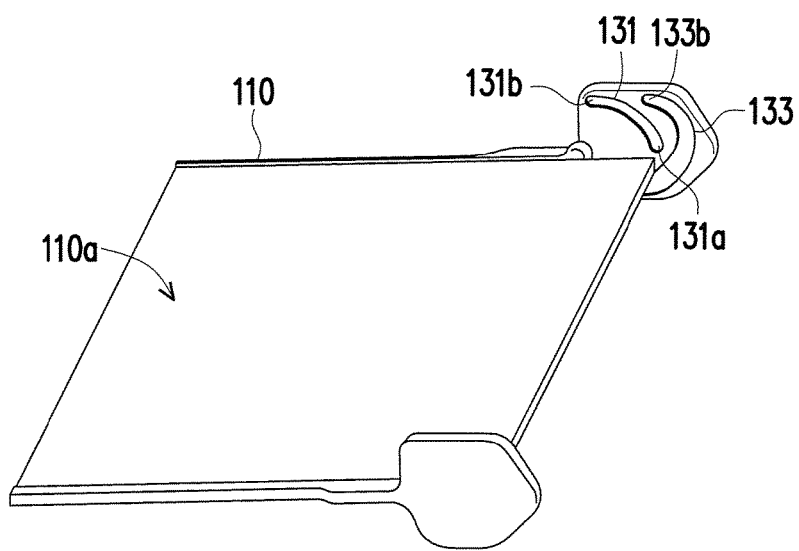
FIGS. 3B and 3C illustrate physical models of two neighboring support units and foldable bodies.
Figure 3C:
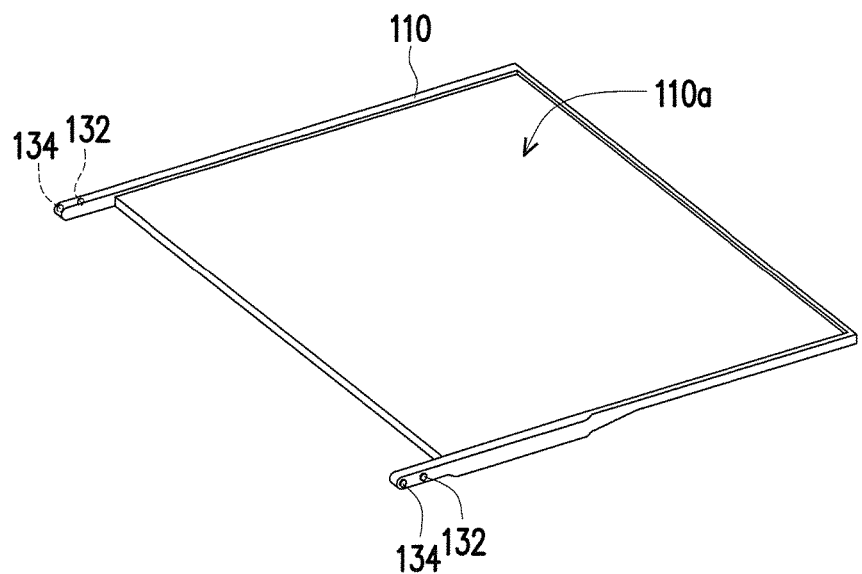

FIGS. 3B and 3C illustrate physical models of the two neighboring supporting units 110 and the foldable bodies 130. The main track 131 and the auxiliary track 133 are configured on an extended portion of the supporting unit 110 on the left side, and the main shaft 132 and the auxiliary shaft 134 are configured on an extended portion of the supporting unit 110 on the right side.

As FIG. 4A illustrates, when the main shaft 132 is moved along the main track 131 to the first main position point 131a in the main track 131 and the auxiliary shaft 134 is moved along the auxiliary track 133 to the first auxiliary position point 133a in the auxiliary track 133, the supporting surfaces 110a are configured to be parallel to each other, and the main track 131 and the flexible display panel 120 are located at the same side of the supporting surfaces 110a. Thereby, the flexible display panel 120 can be supported by the supporting surfaces 110a when in use.

Figure 4B:
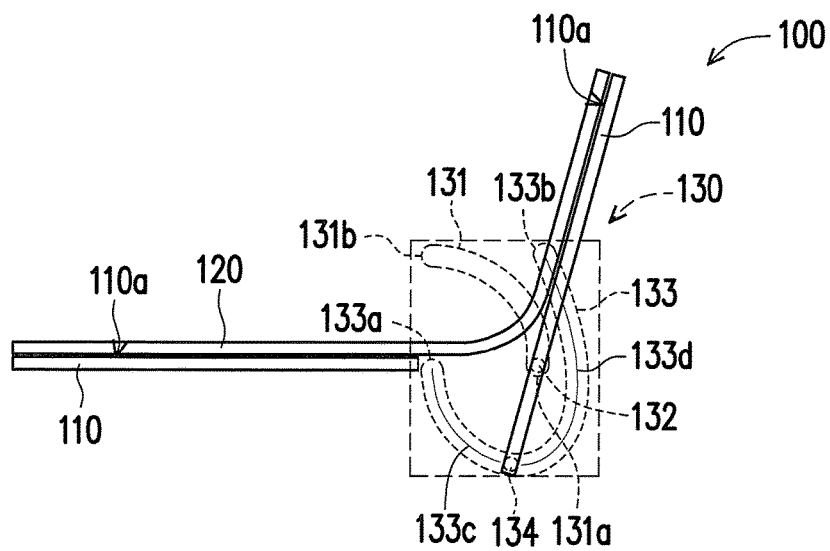

As FIGS. 4A to 4B illustrate, when the main shaft 132 is at the first main position point 131a in the main track 131, rotation of the main shaft 132 relative to the main track 131 causes the supporting unit 110 on the right side to be rotated relative to the supporting unit 110 on the left side. As FIG. 4B illustrates, when the flexible display panel 120 is bent inward (upward), part of the supporting unit 110 on the right side moves downward. In the present embodiment, the supporting units 110 are designed to be protruding on the left and withdrawn on the right, wherein the main shaft 132 is configured to be on an extension portion of the supporting unit 110 on the right (withdrawn) side. Therefore, in a bending process, the extension portion of the supporting unit 110 moves downward. Thereby, the tension of the flexible display panel 120 can be cancelled.

Figure 4C:
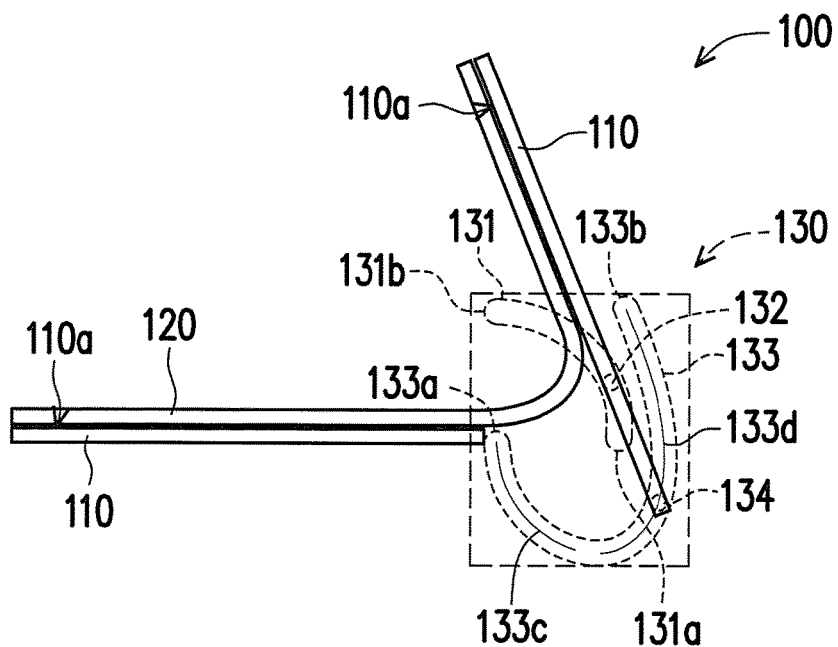
Figure 4D:
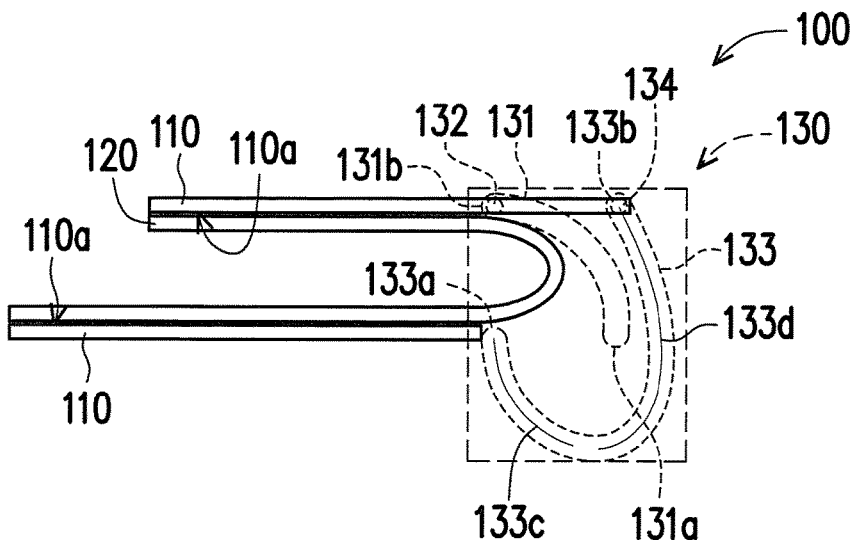

As FIGS. 4B to 4D illustrate, when the main shaft 132 is moved along the main track 131 to the second main position point 131b in the main track 131 and the auxiliary shaft 134 is moved along the auxiliary track 133 to the second auxiliary position point 133b in the auxiliary track 133, the supporting surfaces 110a are configured to be spaced apart by an interval such that the supporting surfaces 110a face each other. As FIG. 4D illustrates, the interval between the two supporting surfaces 110a is determined or controlled by a radius of curvature of the main track 131. A mechanism designer may adjust the radius of curvature of the main track 131 according to the flexibility of the flexible display panel 120 or the situation of use. Therefore, the flexible display panel 120 can retain its radius of curvature in a folded state, such that the flexible display panel 120 in a folded region is not squeezed. Thereby, a portion of the flexible display panel 120 can be bent to the extent of not being distorted.

In the present embodiment, the auxiliary track 133 includes a swing segment 133c and a synchronous motion segment 133d extending from the swing segment 133c. As FIGS. 4A to 4B illustrate, when the main shaft 132 is rotated at the first main position point 131a and the auxiliary shaft 134 is rotated and translated along the swing segment 133c, the two neighboring supporting units 110 are rotated relative to each other along the corresponding main shaft 132. As FIGS. 4B to 4C illustrate, when the main shaft 132 is moved along the main track 131 and the auxiliary shaft 134 is moved along the synchronous motion segment 133d of the auxiliary track 133, the two neighboring supporting units 110 are rotated and translated relative to each other.

In the embodiment illustrated in FIG. 1 and FIGS. 2A to 2D, an operation of bending inward via one single track and one single shaft has been disclosed. As FIG. 2A illustrates, when the supporting surfaces 110a are configured to be parallel to each other, the main track 131 and the flexible display panel 120 are located at the same side of the supporting surfaces 110a. In the embodiment illustrated in FIG. 5 and FIGS. 6A to 6D, an operation of bending outward via one single track and one single shaft will be disclosed. As FIG. 6A illustrates, when the supporting surfaces 110a are configured to be parallel to each other, the main track 131 and the flexible display panel 120 are respectively at two sides of the supporting surfaces 110a.

Figure 6A:
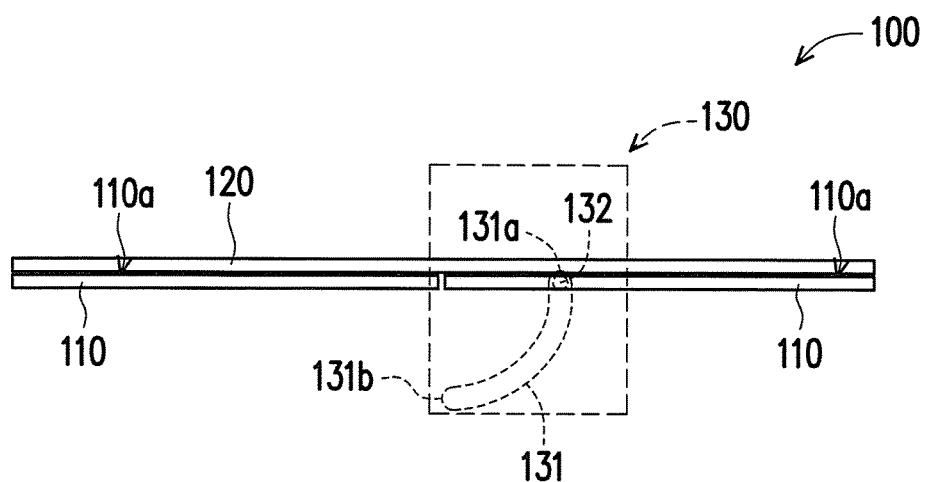
FIGS. 6A to 6D illustrate a transitional process of the foldable display apparatus of FIG. 5.

As FIG. 6A illustrates, when the main shaft 132 is moved along the main track 131 to the first main position point 131a in the main track 131, the supporting surfaces 110a are configured to be parallel to each other. Therefore, the flexible display panel 120 can be supported by the supporting surfaces 110a when in use.

Figure 6B:
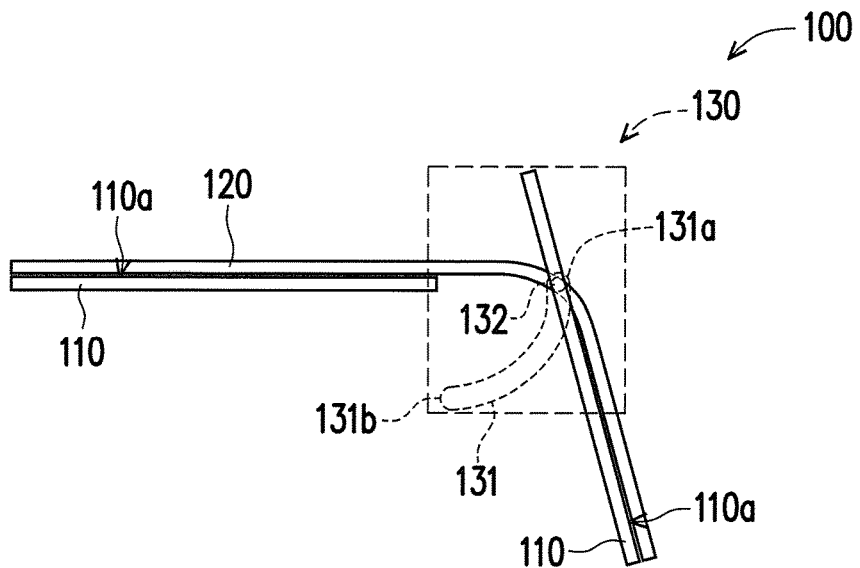

As FIGS. 6A to 6B illustrate, when the main shaft 132 is at the first main position point 131a in the main track 131, rotation of the main shaft 132 relative to the main track 131 causes the supporting unit 110 on the right side to be rotated relative to the supporting unit 110 on the left side. As FIG. 4B illustrates, when the flexible display panel 120 is bent outward (downward), part of the supporting unit 110 on the right side moves upward. In the present embodiment, the supporting units 110 are designed to be protruding on the left and withdrawn on the right, wherein the main shaft 132 is configured to be on an extension portion of the supporting unit 110 on the right (withdrawn) side. Therefore, in a bending process, the extension portion of the supporting unit 110 moves upward. Thereby, the tension of the flexible display panel 120 can be cancelled.

Figure 6C:
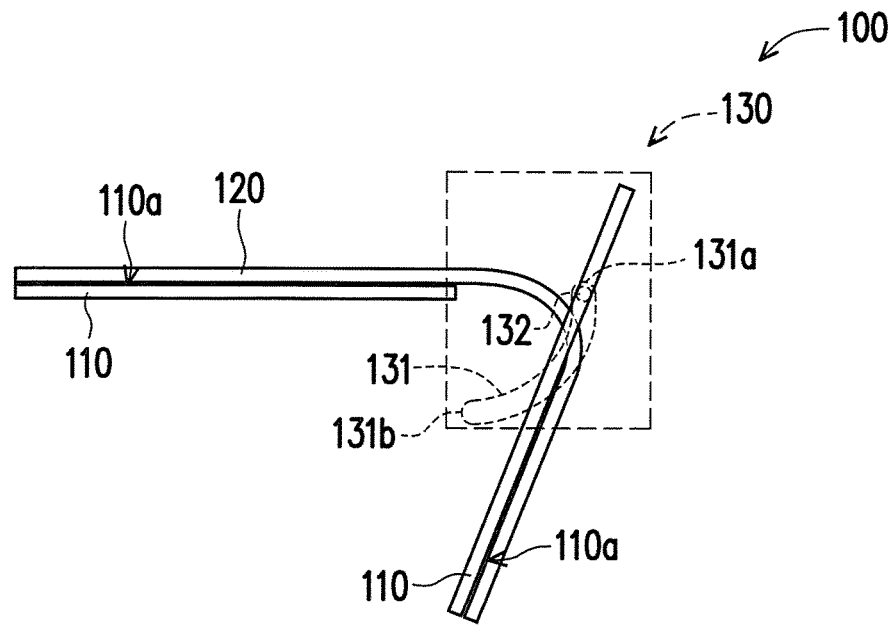
Figure 6D:
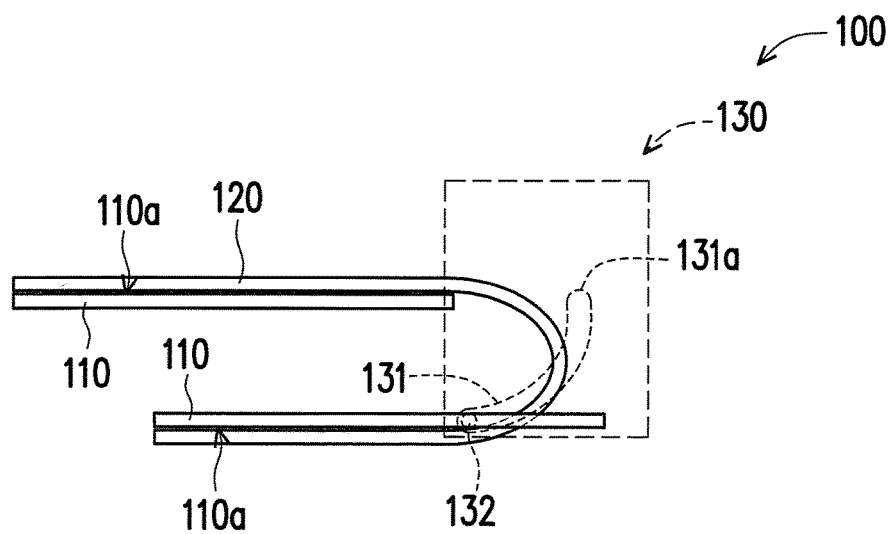

As FIGS. 6B to 6D illustrate, when the main shaft 132 is moved along the main track 131 to the second main position point 131b in the main track 131, the supporting surfaces 110a are configured to be spaced apart by an interval such that the supporting surfaces 110a face away from each other. As FIG. 6D illustrates, the interval between the two supporting surfaces 110a is determined or controlled by a radius of curvature of the main track 131. A mechanism designer may adjust the radius of curvature of the main track 131 according to the flexibility of the flexible display panel 120 or the situation of use. Therefore, the flexible display panel 120 can retain its radius of curvature in a folded state, such that the flexible display panel 120 in a folded region is not squeezed. Thereby, a portion of the flexible display panel 120 can be bent to the extent of not being distorted.

Figure 5:
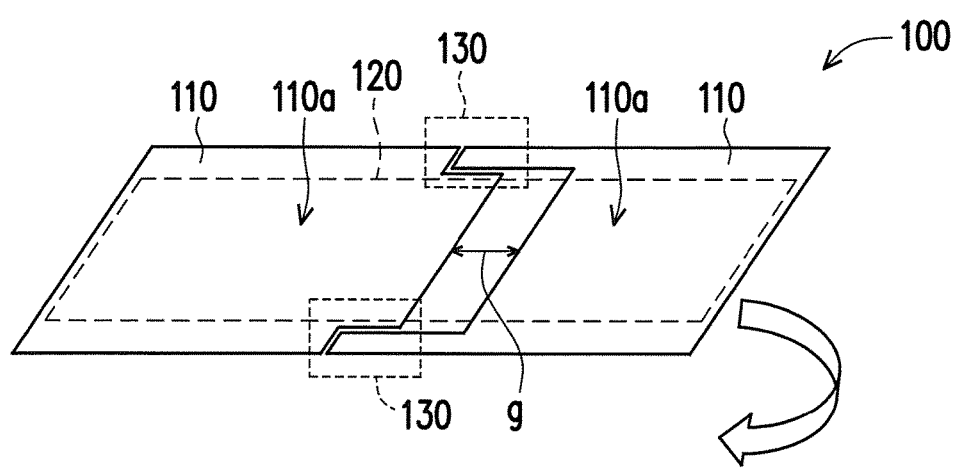
FIG. 5 is a schematic view of a foldable display apparatus of another embodiment of the disclosure.

It should be noted that, as FIG. 5 illustrates, in the operation of bending outward, a gap g (indenting a protrusion portion of the supporting unit 110 on the left side) exists between the two neighboring supporting units 110 so as not to affect bending of the flexible display panel 120 (e.g., preventing the flexible display panel 120 in the folded region from abutting the protrusion portion of the supporting unit 110 on the left side when bent outward).

In the embodiment illustrated in FIG. 3A and FIGS. 4A to 4D, an operation of bending inward via double tracks and double shafts has been disclosed. As FIG. 4A illustrates, when the supporting surfaces 110a are configured to be parallel to each other, the main track 131 and the flexible display panel 120 are located at the same side of the supporting surfaces 110a. In the embodiment of FIG. 7 and FIGS. 8A to 8D, an operation of bending outward via double tracks and double shafts will be disclosed. As FIG. 8A illustrates, when the supporting surfaces 110a are configured to be parallel to each other, the main track 131 and the flexible display panel 120 are respectively located at two sides of the supporting surfaces 110a.

As FIG. 8A illustrates, when the main shaft 132 is moved along the main track 131 to the first main position point 131a in the main track 131 and the auxiliary shaft 134 is moved along the auxiliary track 133 to the first auxiliary position point 133a in the auxiliary track 133, the supporting surfaces 110a are configured to be parallel to each other, and the main track 131 and the flexible display panel 120 are located respectively at two sides of the supporting surfaces 110a. Thereby, the flexible display panel 120 can be supported by the supporting surfaces 110a when in use.

Figure 8A:
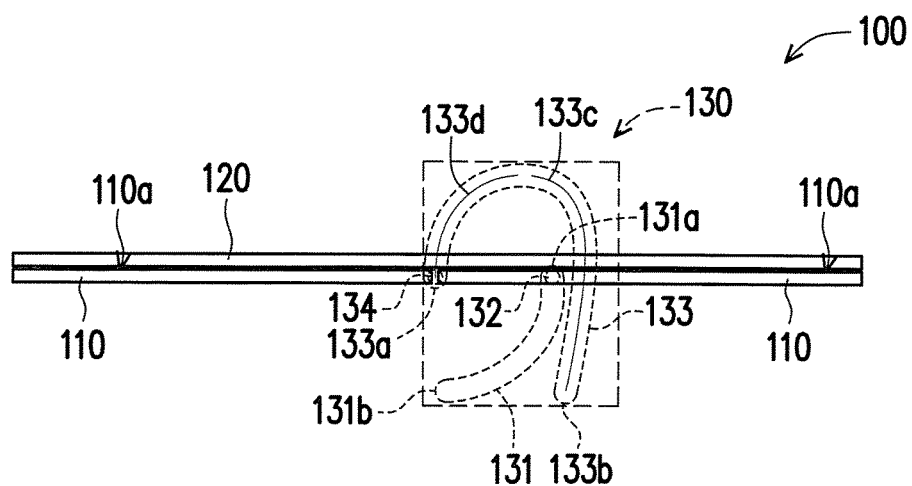
FIGS. 8A to 8D illustrate a transitional process of the foldable display apparatus of FIG. 7.
Figure 8B:
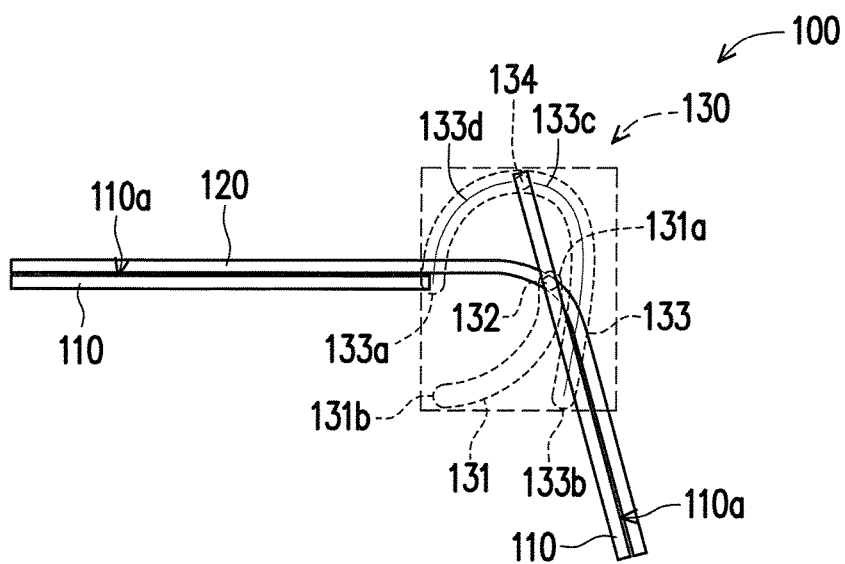

As FIGS. 8A to 8B illustrate, when the main shaft 132 is at the first main position point 131a in the main track 131, rotation of the main shaft 132 relative to the main track 131 causes the supporting unit 110 on the right side to be rotated relative to the supporting unit 110 on the left side.

Figure 8C:
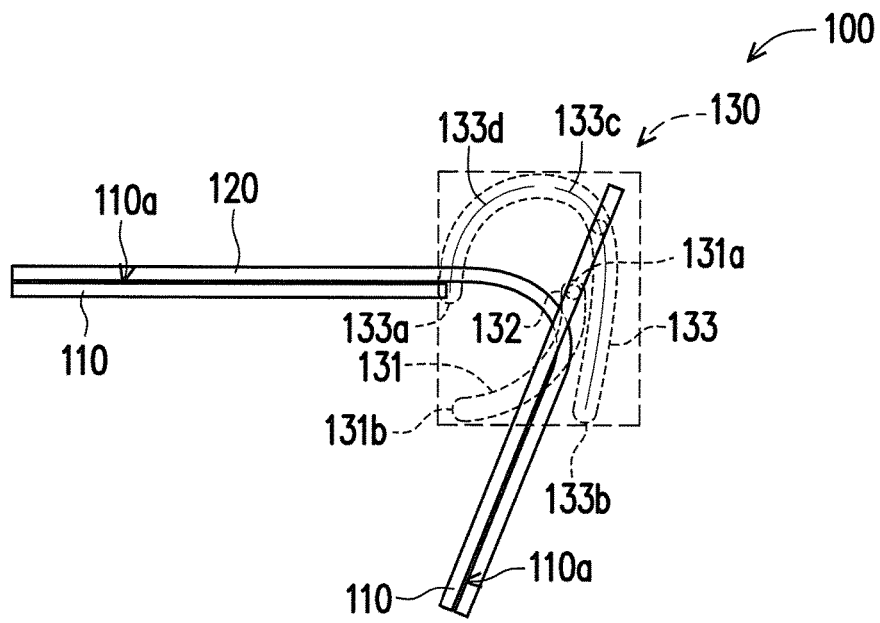
Figure 8D:
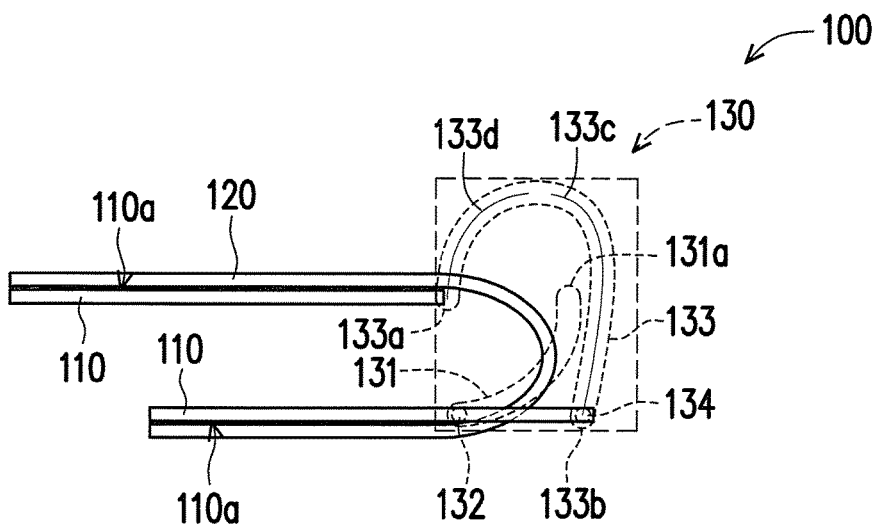

As FIGS. 8B to 8D illustrate, when the main shaft 132 is moved along the main track 131 to the second main position point 131b in the main track 131 and the auxiliary shaft 134 is moved along the auxiliary track 133 to the second auxiliary position point 133b in the auxiliary track 133, the supporting surfaces 110a are configured to be spaced apart by an interval such that the supporting surfaces 110a face away from each other. Thereby, an action of folding the flexible display panel 120 is completed to the extent that a portion of the flexible display panel 120 can be bent without being distorted.

Figure 7:
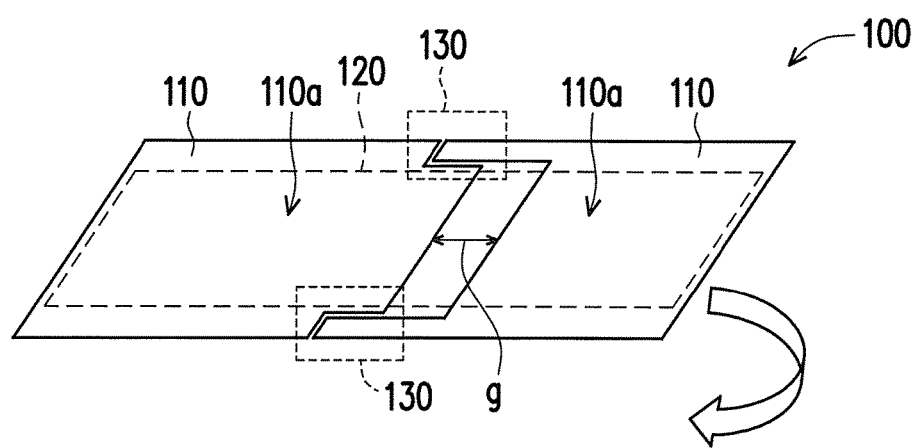
FIG. 7 is a schematic view of a foldable display apparatus of another embodiment of the disclosure.

It should be noted that, as FIG. 7 illustrates, in the operation of bending outward, a gap g exists between the two neighboring supporting units 110 so as not to affect bending of the flexible display panel 120.

Figure 13:
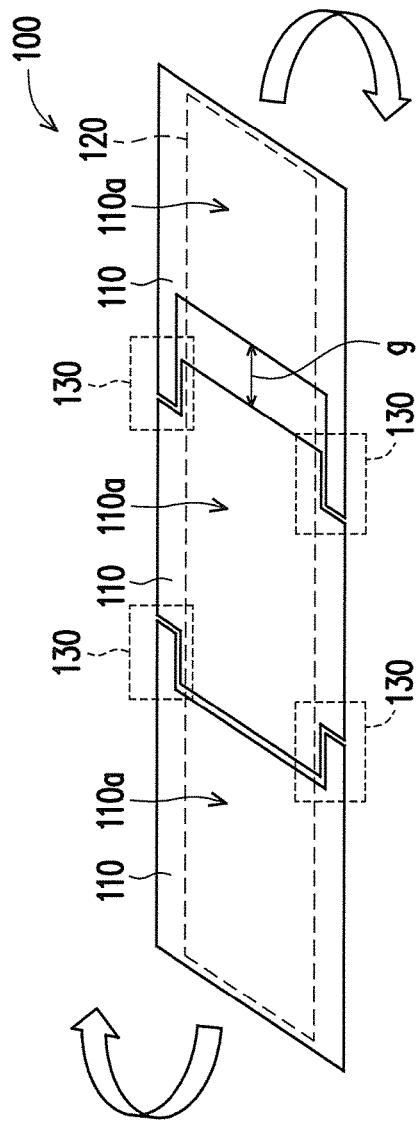
FIG. 13 is a schematic view of a foldable display apparatus of another embodiment of the disclosure.
Figure 14:
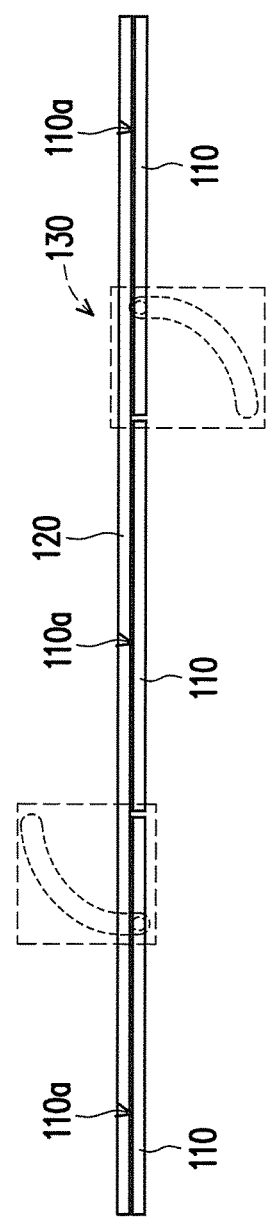
FIG. 14 illustrates the foldable display apparatus of FIG. 13 in a flattened state.

Compared with the embodiment of bending inward via one single track in FIGS. 1 and 2A, in the embodiment of FIGS. 9 and 10, the foldable display apparatus 100 includes three supporting units 110 and two pairs of foldable bodies 130. The supporting units 110 can be bent inward in the way that a staple is bent to complete an action of folding the flexible display panel 120. In the embodiment of FIGS. 11 and 12, the foldable display apparatus 100 includes three supporting units 110 and two pairs of foldable bodies 130. The supporting units 110 can be bent outward in a way similar to the way that a staple is bent to complete an action of folding the flexible display panel 120. In the embodiment of FIGS. 13 and 14, the foldable display apparatus 100 includes three supporting units 110 and two pairs of foldable bodies 130. The supporting units 110 can be bent in a Z pattern to complete an action of folding the flexible display panel 120.

Compared with the embodiment of bending inward via double tracks in FIGS. 3A and 4A, in the embodiment of FIGS. 15 and 16, the foldable display apparatus 100 includes three supporting units 110 and two pairs of foldable bodies 130. The supporting units 110 can be bent inward in the way that a staple is bent to complete an action of folding the flexible display panel 120. In the embodiment of FIGS. 17 and 18, the foldable display apparatus 100 includes three supporting units 110 and two pairs of foldable bodies 130. The supporting units 110 can be bent outward in a way similar to the way that a staple is bent to complete an action of folding the flexible display panel 120. In the embodiment of FIGS. 19 and 20, the foldable display apparatus 100 includes three supporting units 110 and two pairs of foldable bodies 130. The supporting units 110 can be bent in a Z pattern to complete an action of folding the flexible display panel 120.

Figure 21A:
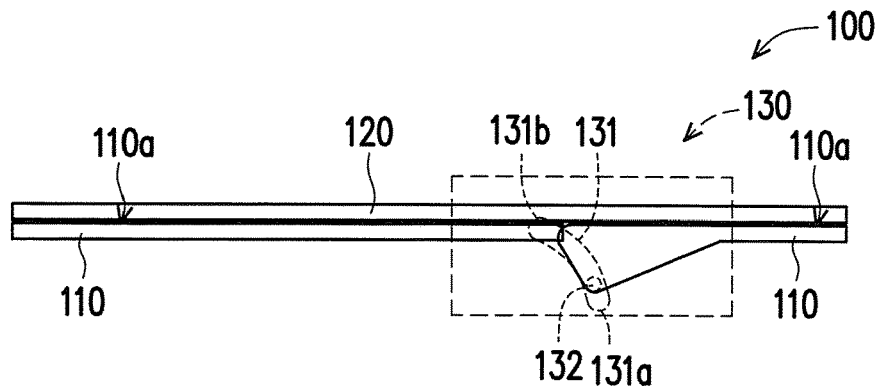
FIGS. 21A to 21C illustrate a transitional process of a foldable display apparatus of another embodiment of the disclosure.
Figure 21B:
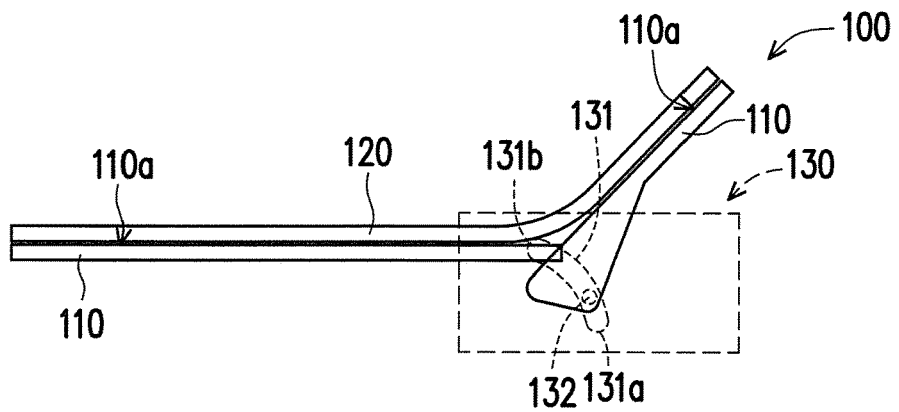
Figure 21C:
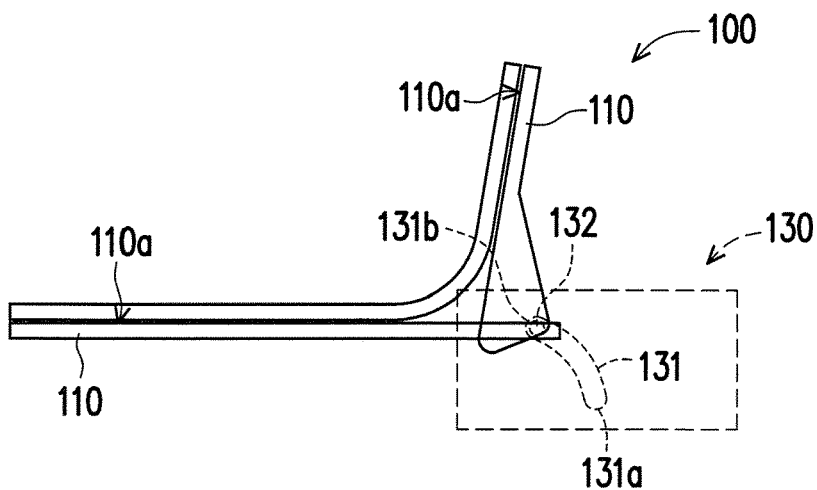

In the embodiment of bending inward via one single track in FIGS. 1 and 2A, the main track 131 and the flexible display panel 120 are located at the same side of the supporting surfaces 110a and protrude from the supporting surfaces 110a. However, in the embodiment of FIG. 21A, the main track 131 of the foldable bodies 130 is lowered to below the supporting surfaces 110a, and the main shaft 132 is also lowered to below the supporting surfaces 110a. Therefore, as FIGS. 21A to 21C illustrate, the two neighboring supporting units 110 are translated and rotated relative to each other. According to a predetermined lowering distance and a limited rotation angle, the two neighboring supporting units 110 can be inclined or perpendicular with respect to each other to bend at least a portion of the flexible display panel 120. Moreover, similar to the embodiment of FIGS. 21A to 21C, as FIGS. 22A to 22B illustrate, a plurality of supporting units 110 can be translated and rotated relative to each other via a plurality of foldable bodies 130 such that supporting units 110 can bend part of the flexible display panel 120. Through the design of lowering the main track 131 and the main shaft 132, the proportion of each of the foldable bodies 130 to the overall height can be reduced.

Figure 23A:
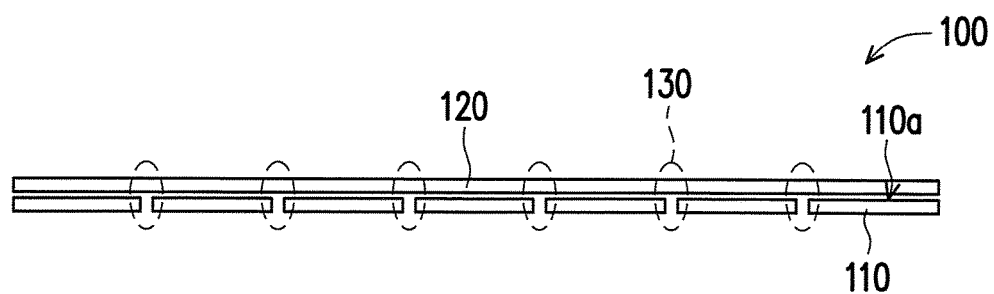
FIGS. 23A to 23B illustrate a transitional process of a foldable display apparatus of another embodiment of the disclosure.
Figure 23B:
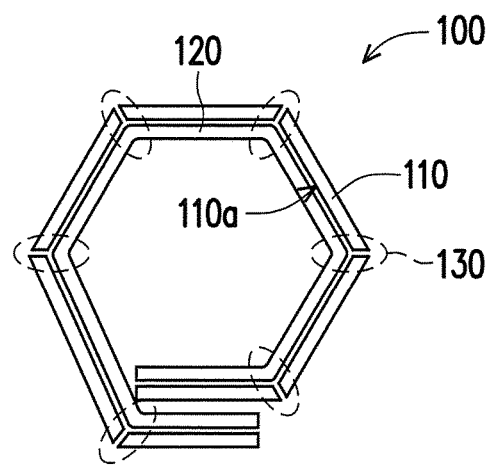
Figure 24A:
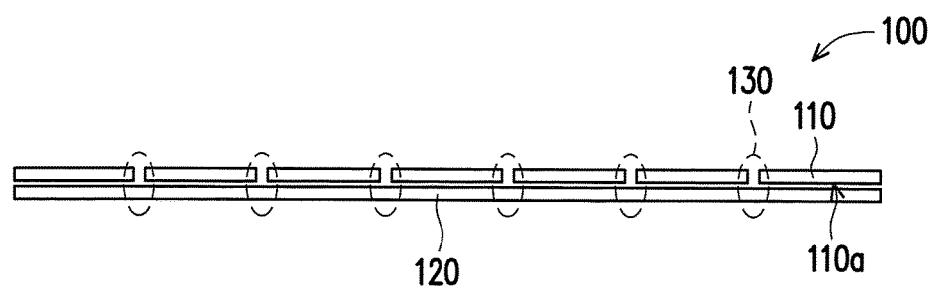
FIGS. 24A to 24B illustrate a transitional process of a foldable display apparatus of another embodiment of the disclosure.
Figure 24B:
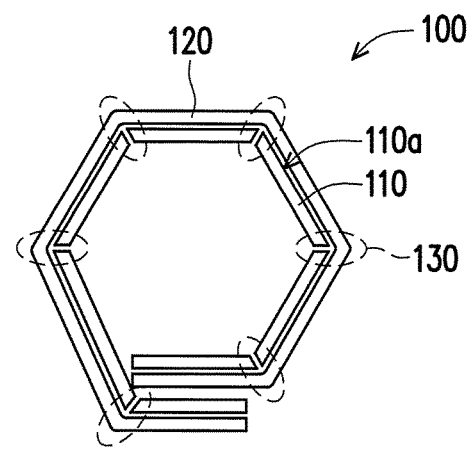

In the embodiment of FIGS. 23A and 23B, three or more supporting units 110 and two or more foldable bodies 130 are used, wherein the foldable bodies 130 may be any of those described in the embodiments above, such that the flexible display panel 120 can be rolled inward. Moreover, in the embodiment of FIGS. 24A and 24B, three or more supporting units 110 and two or more foldable bodies 130 are used, wherein the foldable bodies 130 may be any of those described in the embodiments above, such that the flexible display panel 120 can be rolled outward.

Figure 25:
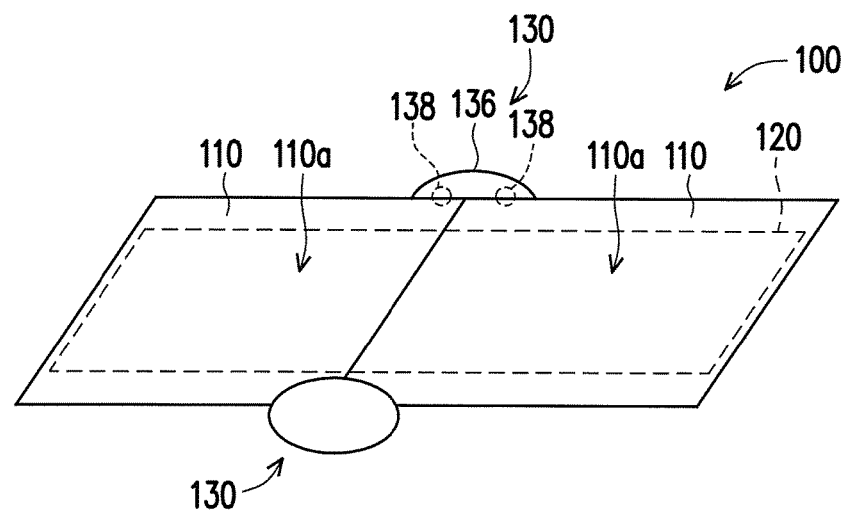
FIG. 25 is a schematic view of a foldable display apparatus of another embodiment of the disclosure.
Figure 26A:
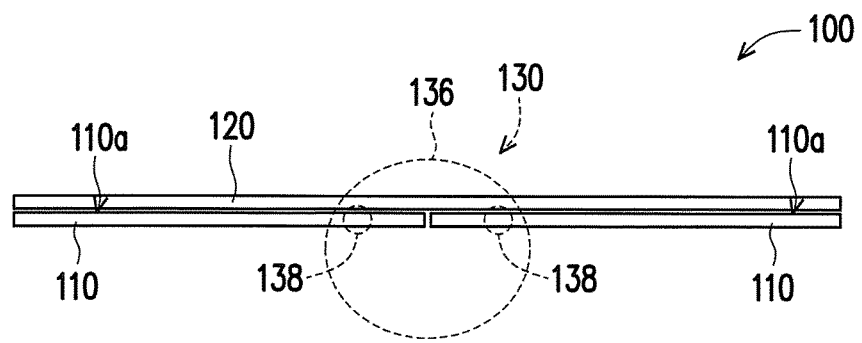
FIGS. 26A to 26C illustrate a transitional process of the foldable display apparatus of FIG. 25.
Figure 26B:
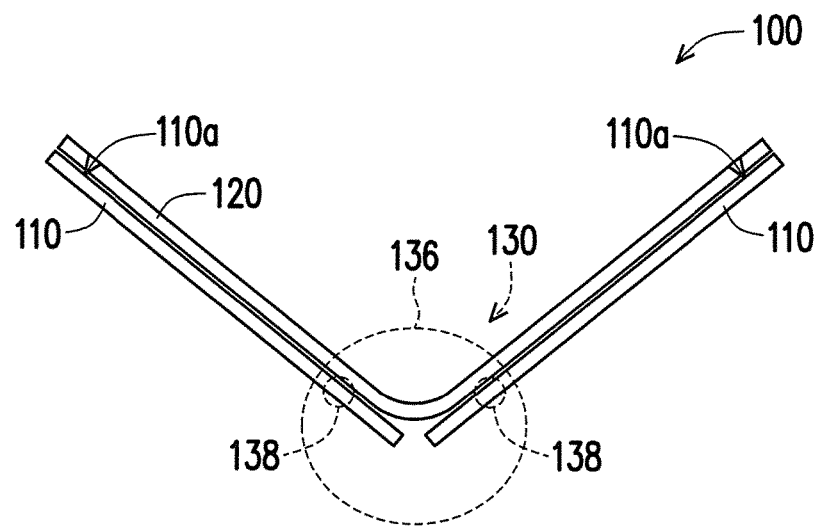
Figure 26C:
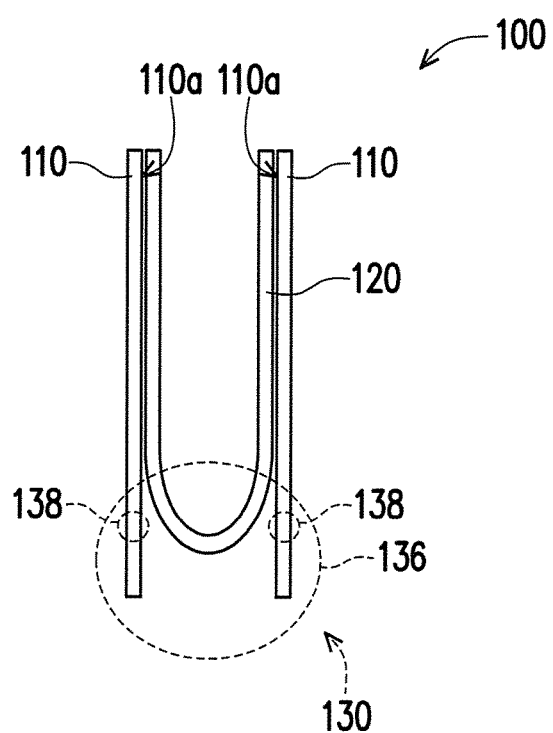

In the embodiment of FIGS. 25 and 26A, the foldable display apparatus 100 includes two supporting units 110, a flexible display panel 120, and at least a pair of foldable bodies 130. Each of the supporting units 110 includes a supporting surface 110a. The flexible display panel 120 is mounted on the supporting surfaces 110a. Each of the foldable bodies 130 is connected between two neighboring ones of the supporting units 110 such that the two neighboring supporting units 110 are moved relative to each other. Each of the foldable bodies 130 includes a connection member 136 and a pair of shafts 138. The pair of shafts 138 pivotally connect the two neighboring supporting units 110 respectively to the connection member 136. As FIGS. 26A to 26C illustrate, each of the supporting units 110 is rotated relative to the connection member 136 via the corresponding shaft 138. Therefore, when each of the supporting units 110 is rotated relative to the connection member 136 to a predetermined angle via the corresponding shaft 138, the supporting surfaces 110a are configured to be spaced apart by an interval such that the supporting surfaces 110a face each other. As FIG. 26C illustrates, the interval between the two supporting surfaces 110a is determined by a distance between the pair of shafts 138. Therefore, the flexible display panel 120 can retain its radius of curvature in a folded state, such that the flexible display panel 120 in a folded region is not squeezed. Thereby, a portion of the flexible display panel 120 can be bent to the extent of not being distorted.

Figure 27:
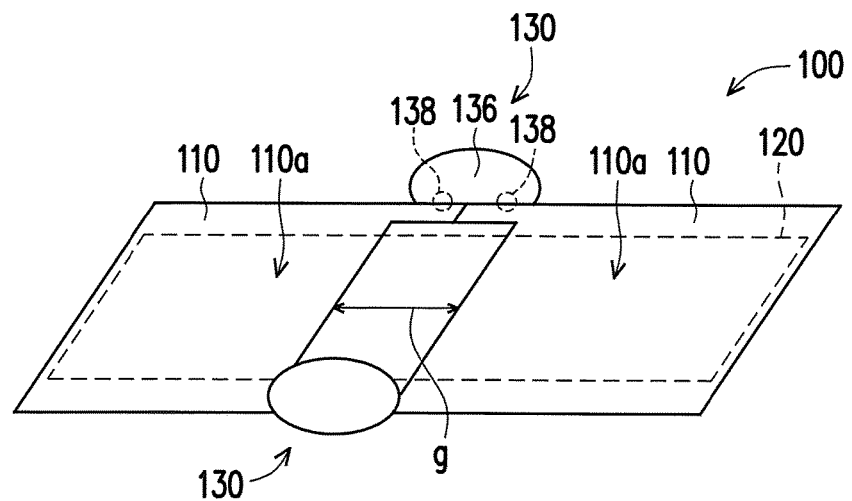
FIG. 27 is a schematic view of a foldable display apparatus of another embodiment of the disclosure.
Figure 28A:
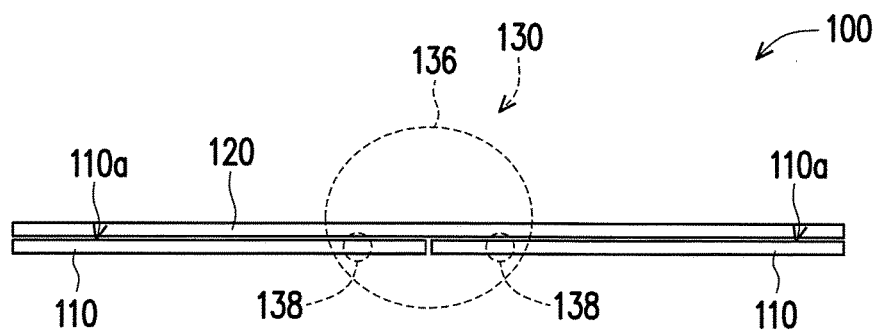
FIGS. 28A to 28C illustrate a transitional process of the foldable display apparatus of FIG. 27.
Figure 28B:
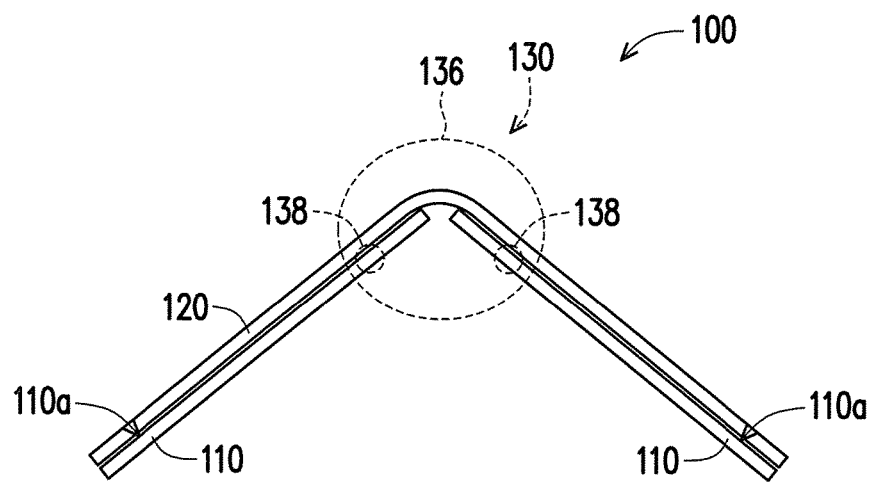
Figure 28C:
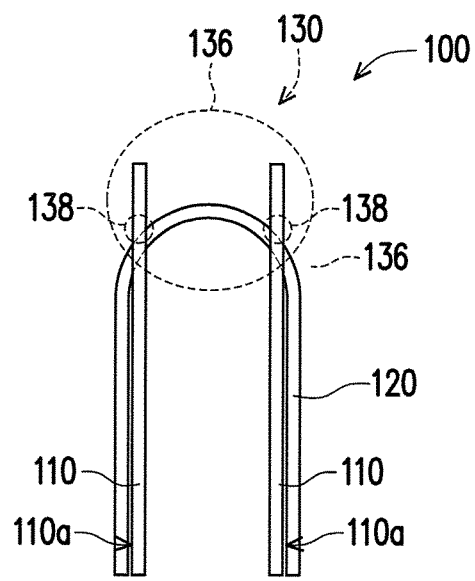

In the embodiment of FIG. 25 and FIGS. 26A to 26C, an operation of bending inward via double shafts has been disclosed. In the embodiment illustrated in FIG. 27 and FIGS. 28A to 28C, an operation of bending outward via double shafts will be disclosed. As FIGS. 28A to 28C illustrate, each of the supporting units 110 is rotated relative to the connection member 136 via the corresponding shaft 138. Therefore, when each of the supporting units 110 is rotated relative to the connection member 136 to a predetermined angle via the corresponding shaft 138, the supporting surfaces 110a are configured to be spaced apart by an interval such that the supporting surfaces 110a face way from each other. Thereby, a portion of the flexible display panel 120 can be bent to the extent of not being distorted to complete an action of folding the flexible display panel 120. It should be noted that, as FIG. 27 illustrates, in the operation of bending outward, a gap g exists between the two neighboring supporting units 110 so as not to affect bending of the flexible display panel 120.

Figure 29:
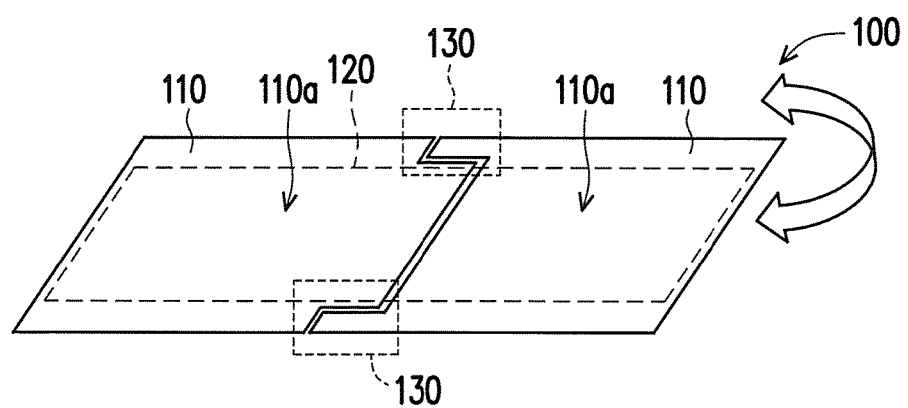
FIG. 29 is a schematic view of a foldable display apparatus of another embodiment of the disclosure.
Figure 30A:
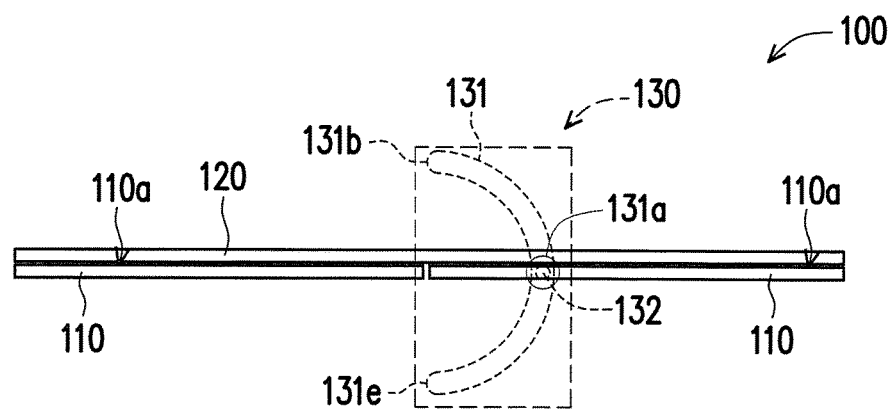
FIGS. 30A to 30C respectively illustrate the foldable display apparatus of FIG. 29 in a flat state, an inward folded state, and an outward folded state.

Referring to FIGS. 29 and 30A, compared with the embodiment of FIGS. 1 and 2A, in the present embodiment, the main track 131 of each of the foldable bodies 130 of the foldable display apparatus 100 further extends toward the other side of the supporting surfaces 110a to achieve a function of bending inward via one single track and bending outward via one single track. Specific description is provided below.

As FIG. 30A illustrates, when the main shaft 132 is moved along the main track 131 to the first main position point 131a in the main track 131, the supporting surfaces 110a are configured to be parallel to each other. Thereby, the flexible display panel 120 can be supported by the supporting surfaces 110*a* when in use.

Figure 30B:
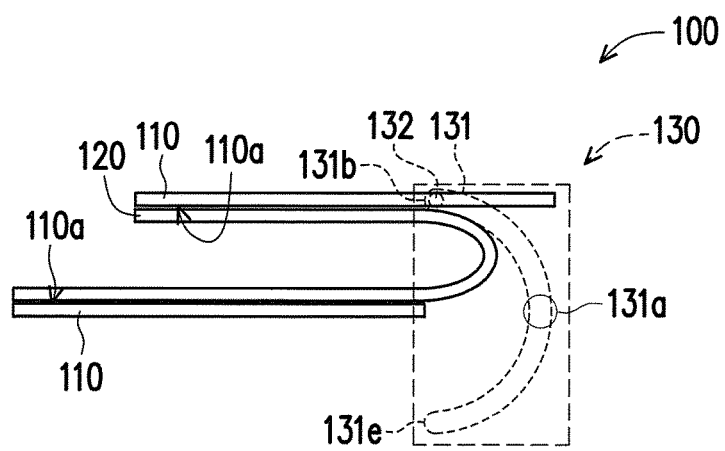

As FIGS. 30A and 30B illustrate, when the main shaft 132 is at the first main position point 131*a* in the main track 131, rotation of the main shaft 132 relative to the main track 131 causes the supporting unit 110 on the right side to be rotated counterclockwise relative to the supporting unit 110 on the left side. When the main shaft 132 is moved along main track 131 to the second main position point 131*b* in the main track 131, the supporting surfaces 110*a* are configured to be spaced apart by an interval such that the supporting surfaces 110*a* face each other. As FIG. 30B illustrates, the interval between the two supporting surfaces 110*a* is determined or controlled by a radius of curvature of the main track 131. A mechanism designer may adjust the radius of curvature of the main track 131 according to the flexibility of the flexible display panel 120 or the situation of use. Therefore, the flexible display panel 120 can retain its radius of curvature in a folded state, such that the flexible display panel 120 in a folded region is not squeezed. Thereby, a portion of the flexible display panel 120 can be bent to the extent of not being distorted.

Figure 30C:
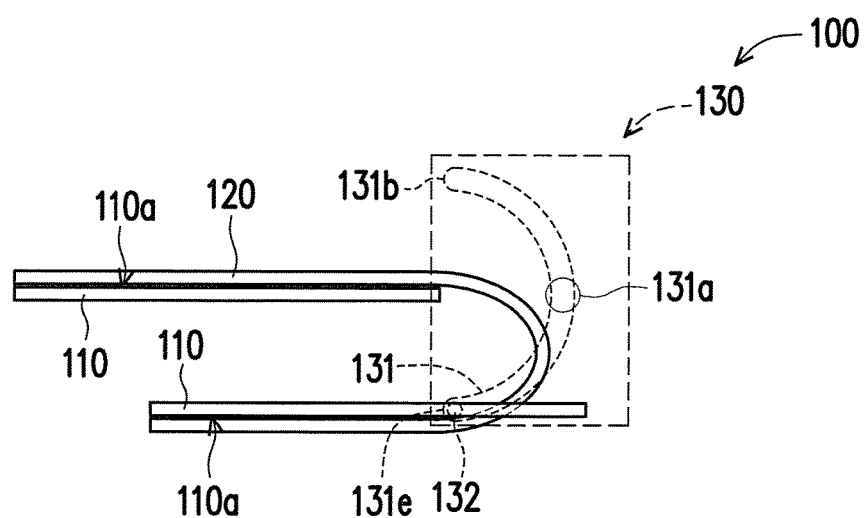

As FIGS. 30A and 30C illustrate, when the main shaft 132 is at the first main position point 131*a* in the main track 131, rotation of the main shaft 132 relative to the main track 131 causes the supporting unit 110 on the right side to be rotated clockwise relative to the supporting unit 110 on the left side. When the main shaft 132 is moved along the main track 131 to the third main position point 131*e* in the main track 131, the supporting surfaces 110*a* face away with an interval therebetween, such that the supporting surfaces 110*a* face away from each other. Thereby, a portion of the flexible display panel 120 can be bent to the extent of not being distorted.

In FIGS. 30A to 30C, the radius of curvature of the main track 131 in segments above and below the supporting surfaces 110*a* may also be different.

In the embodiments above, the mentioned rotations all relate to limited rotations. Therefore, in the embodiments above, at least one blocker or at least one stopper portion may be used to limit an angle range of rotation so as to ensure that creases are not generated on the flexible display panel 120 in a flattened state or after bending.

Figure 31A:
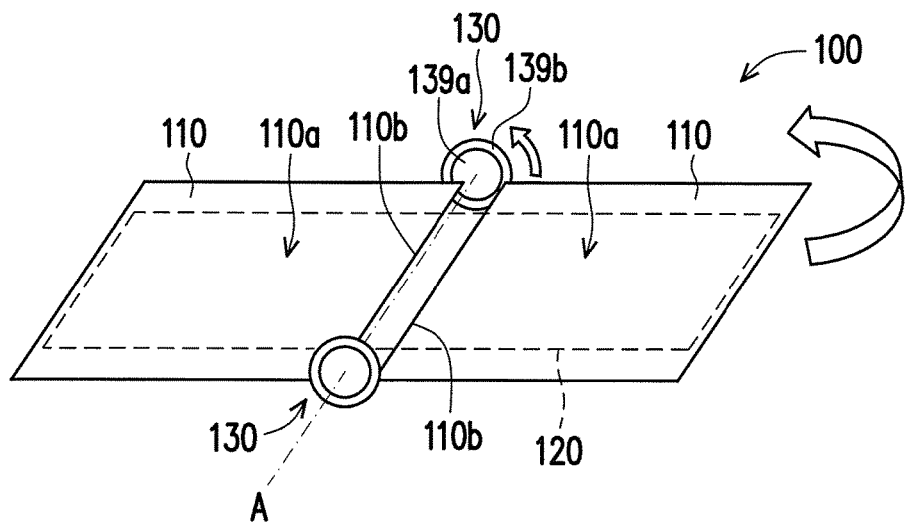
FIGS. 31A and 31B are respectively schematic views of a foldable display apparatus of another embodiment of the disclosure in a flattened state and a folded state.
Figure 31B:
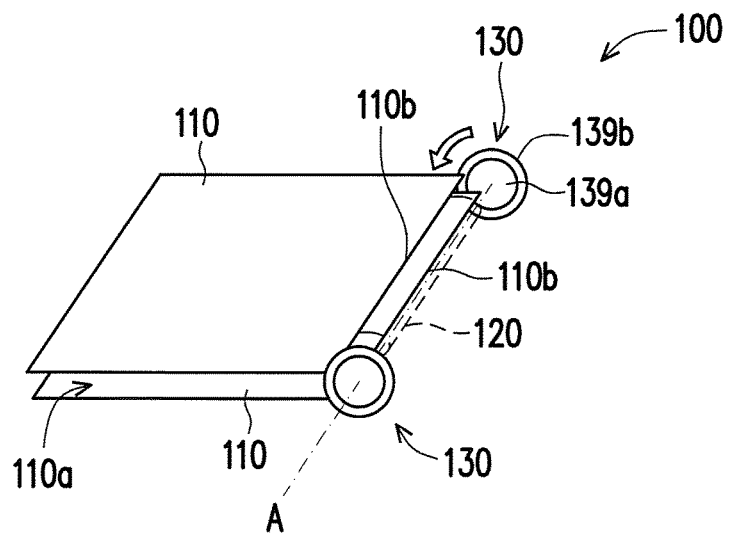

In the embodiment of FIG. 31A and FIG. 31B, the foldable display apparatus 100 includes two supporting units 110, a flexible display panel 120, and at least a pair of foldable bodies 130. Each of the supporting units 110 includes a supporting surface 110*a*. The flexible display panel 120 is mounted on the supporting surfaces 110*a*. Each of the foldable bodies 130 is connected between two neighboring ones of the supporting units 110, such that the two neighboring supporting units 110 are moved relative to each other. Each of the foldable bodies 130 includes an axial portion 139*a* and a bearing 139*b*. The axial portion 139*a* and the bearing 139*b* work with each other such that the axial portion 139*a* and the bearing 139*b* can be rotated relative to each other along an axis A. A side shaft 110*b* (or connection shaft) of each of the supporting units 110 is at a distance from the axis A to be fixedly connected to the axial portion 139*a* or the bearing 139*b*, and the two distances are different. Therefore, each of the supporting units 110 can move along the axis A in a satellite manner to change relative positions of the supporting surfaces 110*a* relative to the axis A. As FIG. 31B illustrates, the supporting unit 110 on the right side is flipped to above the supporting unit 110 on the left side. Accordingly, the supporting surfaces 110*a* are configured to be parallel and face each other, such that a portion of the flexible display panel 120 can be bent to the extent of not being distorted.

Figure 32A:
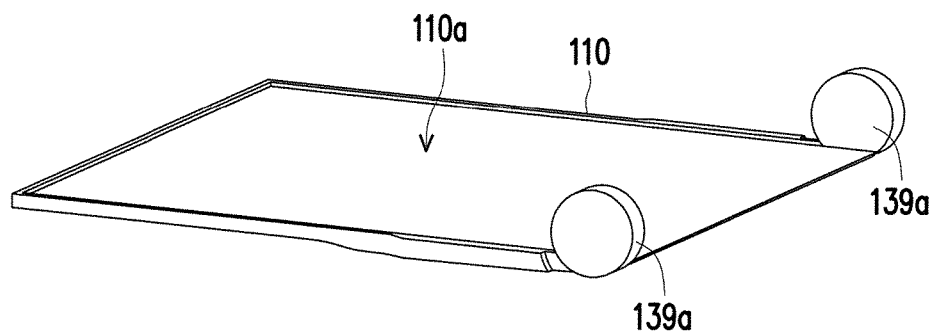
FIGS. 32A and 32B illustrate physical models of two neighboring support units and foldable bodies.
Figure 32B:
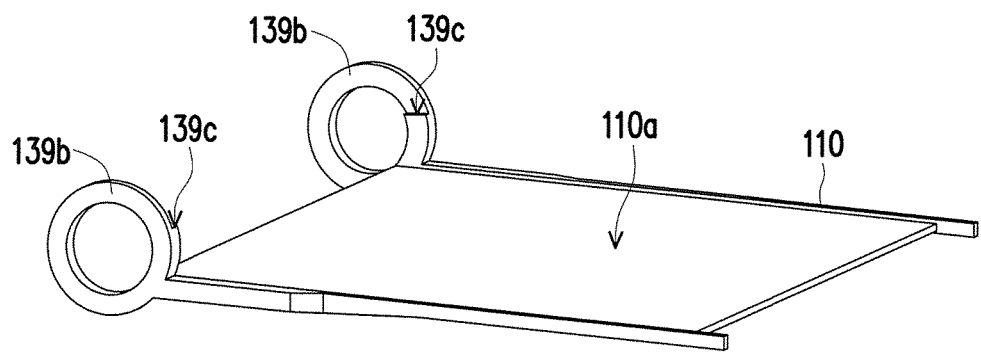
Figure 33A:
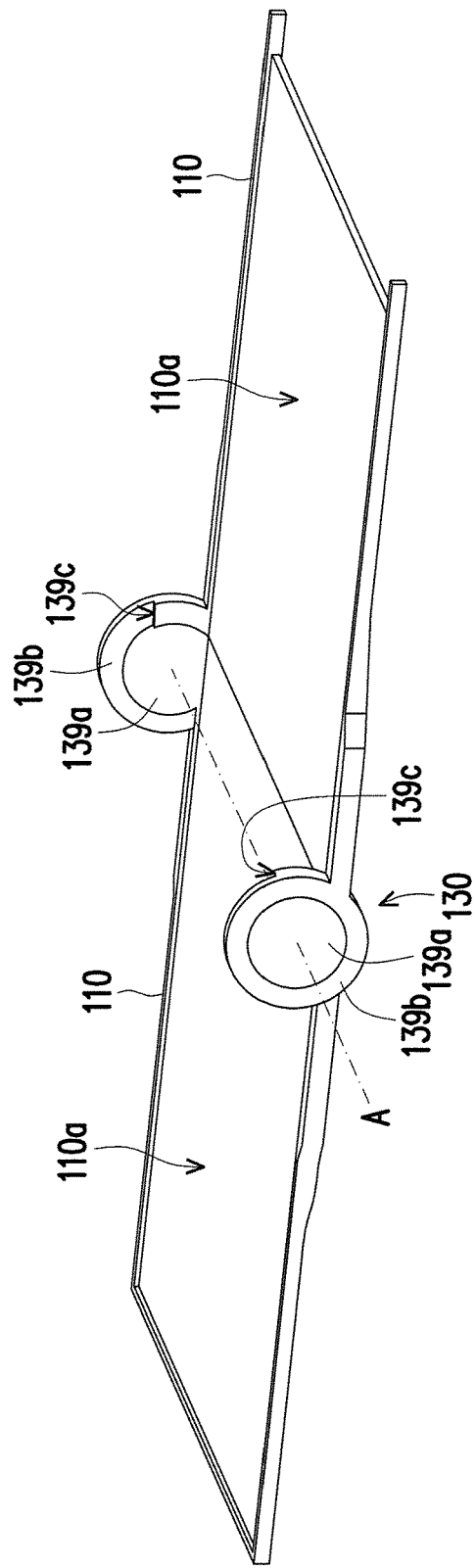
FIGS. 33A and 33B respectively illustrate the physical models of the two neighboring support units and the foldable bodies of FIGS. 32A and 32B in a flattened state and an inward folded state after assembly.

FIGS. 32A and 32B illustrate physical models of the two neighboring supporting units 110 and the foldable bodies 130. The assembled models are as illustrated in FIG. 33A. In the present embodiment, each of the foldable bodies 130 may further include a stopper portion 139*c*. The axial portion 139*a* may be formed by a portion extending from the supporting unit 110 in FIG. 32A, and the bearing 139*b* and the stopper portion 139*c* may be formed by a portion extending from the supporting unit 110 in FIG. 32A. In another embodiment, the stopper portion 139*c* may also by formed by a portion extending from the supporting unit 110 in FIG. 32B.

As FIG. 33A illustrates, the two supporting units 110 are rotated relative to each other via the pair of foldable bodies 130 until they are joined together, such that the supporting surfaces 110*a* are configured to be parallel to each other, and the supporting surfaces 110*a* deviate downward from the axis A of the axial portion 139*a*. Thereby, the flexible display panel 120 can be supported by the supporting surfaces 110*a* when in use.

Figure 33B:
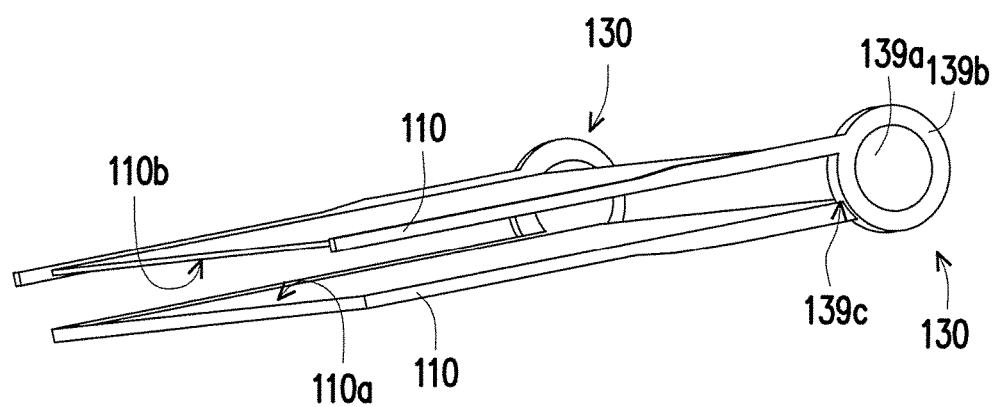

As FIGS. 33A to 33B illustrate, when the axial portion 139*a* is rotated relative to the bearing 139*b* until the supporting unit 110 abuts the stopper portion 139*c*, the supporting surfaces 110*a* are configured to be spaced apart by an interval, such that the supporting surfaces 110*a* face each other. Thereby, a portion of the flexible display panel 120 can be bent to the extent of not being distorted.

The embodiment of FIGS. 31A and 31B are in a form of folding inward. However, the embodiment of FIGS. 31A and 31B may also be changed to a form of folding outward in a way similar to the embodiments above, which shall not be repeated here.

In summary of the above, in the disclosure, the two neighboring supporting units are connected by the foldable bodies, such that the supporting units are moved, such as being translated, rotated, or both, relative to each other, to bend at least a portion of the flexible display panel. Moreover, through the operations of bending inward or bending outward, the flexible display panel can be concealed or at least a portion of the flexible display panel can be exposed.

Although the disclosure is disclosed as the embodiments above, the embodiments are not meant to limit the disclosure. Any person skilled in the art may make slight modifications and variations without departing from the spirit and scope of the disclosure. Therefore, the protection scope of the disclosure shall be defined by the claims attached below.

What is claimed is:

1. A foldable body adapted to be connected between two neighboring ones of a plurality of supporting units, such that the two neighboring supporting units are moved relative to each other to flatten or bend a flexible display panel mounted on a supporting surface of each of the supporting units, the foldable body comprising:
    a main track unmovably fixedly connected to one of the two neighboring supporting units; and
    a main shaft unmovably fixedly connected to the other of the two neighboring supporting units and coupled to the main track to be translated and rotated in the main track, such that the supporting surfaces are configured to be parallel to each other, inclined relative to each other, or spaced apart from each other by an interval.

2. The foldable body according to claim 1, wherein the main track comprises a first main position point and a second main position point, and the supporting surfaces are configured to be parallel to each other when the main shaft is moved along the main track to the first main position point in the main track.

3. The foldable body according to claim 2, wherein the supporting surfaces are configured to be spaced apart by an interval when the main shaft is moved along the main track to the second main position point in the main track.

4. The foldable body according to claim 1, wherein the main track and the flexible display panel are at a same side of the supporting surfaces when the supporting surfaces are configured to be parallel to each other.

5. The foldable body according to claim 1, wherein the main track and the flexible display panel are respectively at two sides of the supporting surfaces when the supporting surfaces are configured to be parallel to each other.

6. The foldable body according to claim 2, further comprising:
   an auxiliary track fixedly connected to one of the two neighboring supporting units; and
   an auxiliary shaft fixedly connected to the other of the two neighboring supporting units and coupled to the auxiliary track to be translated and rotated in the auxiliary track.

7. The foldable body according to claim 6, wherein the auxiliary track comprises a first auxiliary position point and a second auxiliary position point, and the supporting surfaces are configured to be parallel to each other when the main shaft is moved along the main track to the first main position point in the main track and the auxiliary shaft is moved along the auxiliary track to the first auxiliary position point in the auxiliary track.

8. The foldable body according to claim 7, wherein the supporting surfaces are configured to be spaced apart by an interval when the main shaft is moved along the main track to the second main position point in the main track and the auxiliary shaft is moved along the auxiliary track to the second auxiliary position point in the auxiliary track.

9. The foldable body according to claim 7, wherein the auxiliary track comprises a swing segment and a synchronous motion segment extending from the swing segment, wherein the two neighboring supporting units are rotated relative to each other along the corresponding main shaft when the main shaft is rotated at the first main position point and the auxiliary shaft is rotated and translated along the swing segment, and wherein the two neighboring supporting units are rotated and translated relative to each other when the main shaft is moved along the main track and the auxiliary shaft is moved along the synchronous motion segment of the auxiliary track.

10. The foldable body according to claim 3, wherein the main track further comprises a third main position point, wherein the supporting surfaces are located between the flexible display panel when the main shaft is moved along the main track to the third main position point in the main track.

11. The foldable body according to claim 1, wherein upon the supporting surfaces are parallel to each other, edges of the support surface closer to the main track are not aligned with each other and edges of the support surface farther away from the main track are not aligned with each other.

* * * * *